United States Patent
Park et al.

(10) Patent No.: US 10,742,283 B2
(45) Date of Patent: Aug. 11, 2020

(54) TRANSMIT DIVERSITY SCHEMES FOR UPLINK SEQUENCE TRANSMISSIONS

(71) Applicant: QUALCOMM Incorporated, San Diego, CA (US)

(72) Inventors: Seyong Park, San Diego, CA (US); Yi Huang, San Diego, CA (US); Renqiu Wang, San Diego, CA (US); Peter Gaal, San Diego, CA (US); Wanshi Chen, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/046,840

(22) Filed: Jul. 26, 2018

(65) Prior Publication Data
US 2019/0036582 A1    Jan. 31, 2019

Related U.S. Application Data

(60) Provisional application No. 62/538,592, filed on Jul. 28, 2017.

(51) Int. Cl.
*H04B 7/06* (2006.01)
*H04B 7/0404* (2017.01)
(Continued)

(52) U.S. Cl.
CPC ......... *H04B 7/0615* (2013.01); *H04B 7/0404* (2013.01); *H04B 7/068* (2013.01);
(Continued)

(58) Field of Classification Search
CPC .... H04B 7/0615; H04B 7/0404; H04B 7/068; H04B 7/0689; H04B 7/0673;
(Continued)

(56) References Cited

U.S. PATENT DOCUMENTS

2017/0094621 A1*  3/2017  Xu ................... H04W 56/001
2017/0111894 A1*  4/2017  Chen ................. H04L 5/0048
(Continued)

FOREIGN PATENT DOCUMENTS

| WO | WO-2018004256 A1 | 1/2018 |
| WO | WO-2018009043 A1 | 1/2018 |
| WO | WO-2018028309 A1 | 2/2018 |

OTHER PUBLICATIONS

Huawei et al., "Transmit Diversity for PUCCH", 3GPP Draft, R1-1710463, 3rd Generation Partnership Project (3GPP), Mobile Competence Centre, 650, Route Des Lucioles, F-06921 Sophia-Antipolis Cedex, France, vol. RAN WG1, No. Qingdao, China, Jun. 27, 2017-Jun. 30, 2017, Jun. 17, 2017 (Jun. 17, 2017), XP051305061, 6 Pages.
(Continued)

*Primary Examiner* — Jianye Wu
(74) *Attorney, Agent, or Firm* — Holland & Hart LLP/Qualcomm

(57) ABSTRACT

Transmit diversity schemes may be used for sending sequence-based signals over multiple antennas. For example, a user equipment (UE) may determine an uplink sequence to be transmitted to a base station using multiple antennas. The UE may utilize a transmit diversity scheme for the multiple-antenna transmission of the uplink sequence, where the transmit diversity scheme utilized may be based on a number of symbol periods during which the sequence is transmitted. In accordance with the transmit diversity scheme, the UE may use multiple transmit antennas to transmit different sequences from respective antennas. In other examples, the UE may transmit the uplink sequence using different time or frequency resources. Additionally, the UE may use some combination of different transmit diversity schemes for sequence-based signals. In some aspects,
(Continued)

the base station may provide an indication of the transmit diversity scheme that the UE is to use for transmitting the uplink sequence.

24 Claims, 22 Drawing Sheets

(51) Int. Cl.
  *H04L 5/00* (2006.01)
  *H04W 72/04* (2009.01)
(52) U.S. Cl.
  CPC ......... *H04B 7/0673* (2013.01); *H04B 7/0684* (2013.01); *H04B 7/0689* (2013.01); *H04L 5/0053* (2013.01); *H04W 72/0413* (2013.01); *H04L 5/0023* (2013.01); *H04L 5/0055* (2013.01)
(58) Field of Classification Search
  CPC ... H04B 7/0684; H04B 7/06; H04W 72/0413; H04W 72/04; H04L 5/0023; H04L 5/0053; H04L 5/0055
  See application file for complete search history.

(56) References Cited

U.S. PATENT DOCUMENTS

| | | |
|---|---|---|
| 2017/0289993 A1 | 10/2017 | Yerramalli et al. |
| 2018/0006769 A1 | 1/2018 | Määttänen et al. |
| 2018/0323935 A1* | 11/2018 | Yerramalli ........ H04W 74/0808 |

OTHER PUBLICATIONS

Huawei et al., "Transmit Diversity for Short Duration PUCCH", 3GPP Draft, R1-1711419, 3rd Generation Partnership Project (3GPP), Mobile Competence Centre, 650, Route Des Lucioles; F-06921 Sophia-Antipolis Cedex, France, vol. RAN WG1, No. Qingdao, China, Jun. 27, 2017-Jun. 30, 2017, Jun. 26, 2017 (Jun. 26, 2017), XP051300607, 4 Pages.
Intel Corporation: "Transmit Diversity for PUCCH", 3GPP Draft, R1-1710556 Intel TXD Scheme PUCCH, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 26, 2017 (Jun. 26, 2017), XP051299763, pp. 1-5.
International Search Report and Written Opinion—PCT/US2018/044147—ISA/EPO—dated Oct. 31, 2018 (175481WO).
LG Electronics: "Consideration on PUCCH Resource Allocation for NR", 3GPP Draft, R1-1715883, 3RD Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017 (Sep. 17, 2017), XP051339343, 13 Pages.
Qualcomm Incorporated: "On UL Diversity Transmission Scheme", 3GPP Draft, R1-1711155 On UL Diversity Transmission Scheme, 3rd Generation Partnership Project (3GPP), Mobile Competence Centre, 650, Route Des Lucioles, F-06921 Sophia-Antipolis Cedex, France, vol. RAN WG1, No. Qingdao, China, Jun. 27, 2017-Jun. 30, 2017, Jun. 26, 2017 (Jun. 26, 2017), XP051300355, pp. 1-4.
Qualcomm Incorporated: "Resource Allocation and Transmit Diversity for PUCCH", 3GPP Draft, R1-1716426 Resource Allocation for PUCCH, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 21, 2017-Aug. 25, 2017, Sep. 17, 2017 (Sep. 17, 2017), XP051339881, pp. 1-14.
ZTE: "NR PUCCH Resource Allocation", 3GPP Draft, R1-1710117 NR PUCCH Resource Allocation, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 26, 2017 (Jun. 26, 2017), XP051299341, pp. 1-7.

\* cited by examiner

TRANSMIT DIVERSITY SCHEMES FOR UPLINK SEQUENCE TRANSMISSIONS

CROSS REFERENCES

The present application for patent claims benefit of U.S. Provisional Patent Application No. 62/538,592 by Park et al., entitled "Transmit Diversity Schemes For Uplink Sequence Transmissions," filed Jul. 28, 2017, assigned to the assignee hereof, and expressly incorporated by reference in its entirety.

BACKGROUND

The following relates generally to wireless communication, and more specifically to transmit diversity schemes for uplink sequence transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems that may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless systems a UE may be configured with, and communicate using, multiple antennas. For instance, the UE may transmit uplink control information (UCI) (e.g., hybrid automatic repeat request (HARQ) feedback, scheduling requests, and the like) to a base station using two or more transmit antennas. However, the transmission of signals using multiple antennas may be affected by conditions that degrade the quality of the signal at a receiving device, such as fading effects that impact a signal-to-noise ratio (SNR) at a receiver. Accordingly, transmit diversity schemes may be used to overcome such conditions and enable reliable communications between devices.

SUMMARY

The described techniques relate to improved methods, systems, devices, or apparatuses that support transmit diversity schemes for uplink sequence transmissions. Generally, the described techniques provide for transmit diversity schemes used for sending sequence-based signals over multiple antennas. For instance, a user equipment (UE) may determine to transmit an uplink sequence (e.g., a short physical uplink control channel (sPUCCH) or other sequence-based transmissions) to a base station using multiple antennas. The UE may thus utilize a transmit diversity scheme for the multiple-antenna transmission of the uplink sequence. The transmit diversity scheme may be based on a number of symbol periods during which the sequence is transmitted. In accordance with the transmit diversity scheme, the UE may use multiple transmit antennas to transmit a different sequence from respective antennas. In other examples, the UE may transmit the uplink sequence using different time or frequency resources, for example, where different transmit antennas transmit the uplink sequence on different resource blocks (RBs). Additionally, the UE may use some combination of different transmit diversity schemes for transmitting sequence-based signals. In some aspects, the base station may provide an indication of the transmit diversity scheme that the UE is to use for transmitting the uplink sequence.

A method of wireless communication is described. The method may include identifying an uplink sequence for the UE to transmit using a set of transmit antennas, receiving an indication of a transmit diversity scheme for the uplink sequence, wherein the transmit diversity scheme is based at least in part on a number of symbol periods used to transmit the uplink sequence, and transmitting the uplink sequence over the number of symbol periods using the set of transmit antennas, the uplink sequence being transmitted in accordance with the indicated transmit diversity scheme.

An apparatus for wireless communication is described. The apparatus may include means for identifying an uplink sequence for the UE to transmit using a set of transmit antennas, means for receiving an indication of a transmit diversity scheme for the uplink sequence, wherein the transmit diversity scheme is based at least in part on a number of symbol periods used to transmit the uplink sequence, and means for transmitting the uplink sequence over the number of symbol periods using the set of transmit antennas, the uplink sequence being transmitted in accordance with the indicated transmit diversity scheme.

Another apparatus for wireless communication is described. The apparatus may include a processor, memory in electronic communication with the processor, and instructions stored in the memory. The instructions may be operable to cause the processor to identify an uplink sequence for the UE to transmit using a set of transmit antennas, receive an indication of a transmit diversity scheme for the uplink sequence, wherein the transmit diversity scheme is based at least in part on a number of symbol periods used to transmit the uplink sequence, and transmit the uplink sequence over the number of symbol periods using the set of transmit antennas, the uplink sequence being transmitted in accordance with the indicated transmit diversity scheme.

A non-transitory computer readable medium for wireless communication is described. The non-transitory computer-readable medium may include instructions operable to cause a processor to identify an uplink sequence for the UE to transmit using a set of transmit antennas, receive an indication of a transmit diversity scheme for the uplink sequence, wherein the transmit diversity scheme is based at least in part on a number of symbol periods used to transmit the uplink sequence, and transmit the uplink sequence over the number of symbol periods using the set of transmit antennas, the uplink sequence being transmitted in accordance with the indicated transmit diversity scheme.

In some examples of the method, apparatus, and non-transitory computer-readable medium described above, transmitting the uplink sequence comprises: transmitting a first uplink sequence using a first transmit antenna of the set of transmit antennas. Some examples of the method, apparatus, and non-transitory computer-readable medium described above may further include processes, features, means, or instructions for transmitting a second uplink sequence using a second transmit antenna of the set of transmit antennas, wherein the first uplink sequence and the second uplink sequence may be transmitted over a single symbol period.

In some examples of the method, apparatus, and non-transitory computer-readable medium described above, the first uplink sequence and the second uplink sequence comprise a different base sequence. In some examples of the method, apparatus, and non-transitory computer-readable medium described above, the first uplink sequence comprises a first base sequence, and the second uplink sequence comprises a shift of the first base sequence, and wherein the shift includes a time domain cyclic shift, or a frequency domain phase rotation, or a combination thereof.

In some examples of the method, apparatus, and non-transitory computer-readable medium described above, transmitting the uplink sequence comprises: transmitting the first uplink sequence on a first set of resources. Some examples of the method, apparatus, and non-transitory computer-readable medium described above may further include processes, features, means, or instructions for transmitting the second uplink sequence on a second set of resources.

In some examples of the method, apparatus, and non-transitory computer-readable medium described above, transmitting the uplink sequence comprises: transmitting the uplink sequence on a first set of resources using a first transmit antenna of the set of transmit antennas. Some examples of the method, apparatus, and non-transitory computer-readable medium described above may further include processes, features, means, or instructions for transmitting the uplink sequence on a second set of resources using a second transmit antenna of the set of transmit antennas, wherein the uplink sequence may be transmitted over a single symbol period.

In some examples of the method, apparatus, and non-transitory computer-readable medium described above, transmitting the uplink sequence comprises: transmitting the uplink sequence over a first symbol period using a first transmit antenna of the set of transmit antennas. Some examples of the method, apparatus, and non-transitory computer-readable medium described above may further include processes, features, means, or instructions for transmitting the uplink sequence over a second symbol period using a second transmit antenna of the set of transmit antennas.

Some examples of the method, apparatus, and non-transitory computer-readable medium described above may further include processes, features, means, or instructions for transmitting the uplink sequence over the first symbol period and the second symbol period using a frequency hopping pattern, or a sequence hopping pattern, or a combination thereof.

In some examples of the method, apparatus, and non-transitory computer-readable medium described above, transmitting the uplink sequence comprises: transmitting a first uplink sequence using a first transmit antenna of the set of transmit antennas. Some examples of the method, apparatus, and non-transitory computer-readable medium described above may further include processes, features, means, or instructions for transmitting a second uplink sequence using a second transmit antenna of the set of transmit antennas, wherein the first uplink sequence and the second uplink sequence are transmitted over a first symbol period. Some examples of the method, apparatus, and non-transitory computer-readable medium described above may further include processes, features, means, or instructions for transmitting a repetition of the first uplink sequence using the first transmit antenna of the set of transmit antennas. Some examples of the method, apparatus, and non-transitory computer-readable medium described above may further include processes, features, means, or instructions for transmitting a repetition of the second uplink sequence using the second transmit antenna of the set of transmit antennas, wherein the repetition of the first uplink sequence and the repetition of the second uplink sequence are transmitted over a second symbol period.

Some examples of the method, apparatus, and non-transitory computer-readable medium described above may further include processes, features, means, or instructions for transmitting the first uplink sequence, or the second uplink sequence, or the repetition of the first uplink sequence, or the repetition of the second uplink sequence, or a combination thereof, using a frequency hopping pattern, or a sequence hopping pattern, or a combination thereof. In some examples of the method, apparatus, and non-transitory computer-readable medium described above, transmitting the uplink sequence comprises: transmitting a first portion of the uplink sequence over a first symbol period using a first transmit antenna of the set of transmit antennas. Some examples of the method, apparatus, and non-transitory computer-readable medium described above may further include processes, features, means, or instructions for transmitting a second portion of the uplink sequence over a second symbol period using a second transmit antenna of the set of transmit antennas.

Some examples of the method, apparatus, and non-transitory computer-readable medium described above may further include processes, features, means, or instructions for transmitting the uplink sequence over the first symbol period and the second symbol period using a frequency hopping pattern, or a sequence hopping pattern, or a combination thereof. In some examples of the method, apparatus, and non-transitory computer-readable medium described above, transmitting the uplink sequence comprises: transmitting a first uplink sequence on a first set of resources using a first transmit antenna of the set of transmit antennas. Some examples of the method, apparatus, and non-transitory computer-readable medium described above may further include processes, features, means, or instructions for transmitting a second uplink sequence on a second set of resources using a second transmit antenna of the set of transmit antennas, wherein the first uplink sequence and the second uplink sequence may be transmitted over a two symbol periods.

In some examples of the method, apparatus, and non-transitory computer-readable medium described above, the first uplink sequence and the second uplink sequence comprise an Alamouti pair. Some examples of the method, apparatus, and non-transitory computer-readable medium described above may further include processes, features, means, or instructions for selecting the transmit diversity scheme from a set of preconfigured transmit diversity schemes based at least in part on the indicated transmit diversity scheme. In some examples of the method, apparatus, and non-transitory computer-readable medium described above, the uplink sequence comprises a sequence-based sPUCCH, and wherein the sequence-based sPUCCH comprises one-bit uplink control information or two-bit uplink control information.

A method of wireless communication is described. The method may include determining a transmit diversity scheme for receiving an uplink sequence from a user equipment (UE), wherein the transmit diversity scheme is based at least in part on a number of symbol periods used by the UE to transmit the uplink sequence, transmitting an indication of the determined transmit diversity scheme for the UE to transmit the uplink sequence using a set of transmit antennas, and receiving the uplink sequence over the number of symbol periods, the uplink sequence being received in accordance with the determined transmit diversity scheme.

An apparatus for wireless communication is described. The apparatus may include means for determining a transmit diversity scheme for receiving an uplink sequence from a UE, wherein the transmit diversity scheme is based at least in part on a number of symbol periods used by the UE to transmit the uplink sequence, means for transmitting an indication of the determined transmit diversity scheme for the UE to transmit the uplink sequence using a set of transmit antennas, and means for receiving the uplink sequence over the number of symbol periods, the uplink sequence being received in accordance with the determined transmit diversity scheme.

Another apparatus for wireless communication is described. The apparatus may include a processor, memory in electronic communication with the processor, and instructions stored in the memory. The instructions may be operable to cause the processor to determine a transmit diversity scheme for receiving an uplink sequence from a UE, wherein the transmit diversity scheme is based at least in part on a number of symbol periods used by the UE to transmit the uplink sequence, transmit an indication of the determined transmit diversity scheme for the UE to transmit the uplink sequence using a set of transmit antennas, and receive the uplink sequence over the number of symbol periods, the uplink sequence being received in accordance with the determined transmit diversity scheme.

A non-transitory computer readable medium for wireless communication is described. The non-transitory computer-readable medium may include instructions operable to cause a processor to determine a transmit diversity scheme for receiving an uplink sequence from a UE, wherein the transmit diversity scheme is based at least in part on a number of symbol periods used by the UE to transmit the uplink sequence, transmit an indication of the determined transmit diversity scheme for the UE to transmit the uplink sequence using a set of transmit antennas, and receive the uplink sequence over the number of symbol periods, the uplink sequence being received in accordance with the determined transmit diversity scheme.

In some examples of the method, apparatus, and non-transitory computer-readable medium described above, receiving the uplink sequence comprises: receiving a first uplink sequence transmitted using a first transmit antenna of the set of transmit antennas. Some examples of the method, apparatus, and non-transitory computer-readable medium described above may further include processes, features, means, or instructions for receiving a second uplink sequence transmitted using a second transmit antenna of the set of transmit antennas, wherein the first uplink sequence and the second uplink sequence may be received over a single symbol period.

In some examples of the method, apparatus, and non-transitory computer-readable medium described above, the first uplink sequence and the second uplink sequence comprise a different base sequence. In some examples of the method, apparatus, and non-transitory computer-readable medium described above, the first uplink sequence comprises a first base sequence and the second uplink sequence comprises a shift of the first base sequence, wherein the shift includes a time domain cyclic shift, or a frequency domain phase rotation, or a combination thereof.

In some examples of the method, apparatus, and non-transitory computer-readable medium described above, receiving the uplink sequence comprises: receiving the first uplink sequence on a first set of resources. Some examples of the method, apparatus, and non-transitory computer-readable medium described above may further include processes, features, means, or instructions for receiving the second uplink sequence on a second set of resources. In some examples of the method, apparatus, and non-transitory computer-readable medium described above, receiving the uplink sequence comprises: receiving the uplink sequence, transmitted using a first transmit antenna of the set of transmit antennas, on a first set of resources and. Some examples of the method, apparatus, and non-transitory computer-readable medium described above may further include processes, features, means, or instructions for receiving the uplink sequence, transmitted using a second transmit antenna of the set of transmit antennas, on a second set of resources, wherein the uplink sequence may be received over a single symbol period.

In some examples of the method, apparatus, and non-transitory computer-readable medium described above, receiving the uplink sequence comprises: receiving the uplink sequence, transmitted using a first transmit antenna of the set of transmit antennas, over a first symbol period. Some examples of the method, apparatus, and non-transitory computer-readable medium described above may further include processes, features, means, or instructions for receiving the uplink sequence, transmitted using a second transmit antenna of the set of transmit antennas, over a second symbol period. Some examples of the method, apparatus, and non-transitory computer-readable medium described above may further include processes, features, means, or instructions for receiving the uplink sequence over the first symbol period and the second symbol period in accordance with a frequency hopping pattern, or a sequence hopping pattern, or a combination thereof.

In some examples of the method, apparatus, and non-transitory computer-readable medium described above, receiving the uplink sequence comprises: receiving a first uplink sequence transmitted using a first transmit antenna of the set of transmit antennas. Some examples of the method, apparatus, and non-transitory computer-readable medium described above may further include processes, features, means, or instructions for receiving a second uplink sequence transmitted using a second transmit antenna of the set of transmit antennas, wherein the first uplink sequence and the second uplink sequence are received over a first symbol period. Some examples of the method, apparatus, and non-transitory computer-readable medium described above may further include processes, features, means, or instructions for receiving a repetition of the first uplink sequence transmitted using the first transmit antenna of the set of transmit antennas. Some examples of the method, apparatus, and non-transitory computer-readable medium described above may further include processes, features, means, or instructions for receiving a repetition of the second uplink sequence transmitted using the second transmit antenna of the set of transmit antennas, wherein the repetition of the first uplink sequence and the repetition of the second uplink sequence are received over a second symbol period.

Some examples of the method, apparatus, and non-transitory computer-readable medium described above may further include processes, features, means, or instructions for receiving the first uplink sequence, or the second uplink sequence, or the repetition of the first uplink sequence, or the repetition of the second uplink sequence, or a combination thereof, in accordance with a frequency hopping pattern, or a sequence hopping pattern, or a combination thereof. In some examples of the method, apparatus, and non-transitory computer-readable medium described above, receiving the uplink sequence comprises: receiving a first portion of the uplink sequence over a first symbol period, the first portion of the uplink sequence transmitted using a first transmit antenna of the set of transmit antennas. Some examples of the method, apparatus, and non-transitory computer-readable medium described above may further include processes, features, means, or instructions for receiving a second portion of the uplink sequence over a second symbol period, the second portion of the uplink sequence transmitted using a second transmit antenna of the set of transmit antennas.

Some examples of the method, apparatus, and non-transitory computer-readable medium described above may further include processes, features, means, or instructions for receiving the first portion of the uplink sequence, or the second portion of the uplink sequence, or both, over the first symbol period and the second symbol period in accordance with a frequency hopping pattern, or a sequence hopping pattern, or a combination thereof.

In some examples of the method, apparatus, and non-transitory computer-readable medium described above, receiving the uplink sequence comprises: receiving a first uplink sequence on a first set of resources, the first uplink sequence transmitted using a first transmit antenna of the set of transmit antennas. Some examples of the method, apparatus, and non-transitory computer-readable medium described above may further include processes, features, means, or instructions for receiving a second uplink sequence on a second set of resources, the second uplink sequence transmitted using a second transmit antenna of the set of transmit antennas, wherein the first uplink sequence and the second uplink sequence may be received over a two symbol periods.

In some examples of the method, apparatus, and non-transitory computer-readable medium described above, the first uplink sequence and the second uplink sequence comprise an Alamouti pair. In some examples of the method, apparatus, and non-transitory computer-readable medium described above, determining the transmit diversity scheme for the uplink sequence comprises: selecting the transmit diversity scheme from a set of preconfigured transmit diversity schemes. In some examples of the method, apparatus, and non-transitory computer-readable medium described above, the uplink sequence comprises a sequence-based sPUCCH, and wherein the sequence-based sPUCCH comprises one-bit uplink control information or two-bit uplink control information.

DETAILED DESCRIPTION

Figure 1:
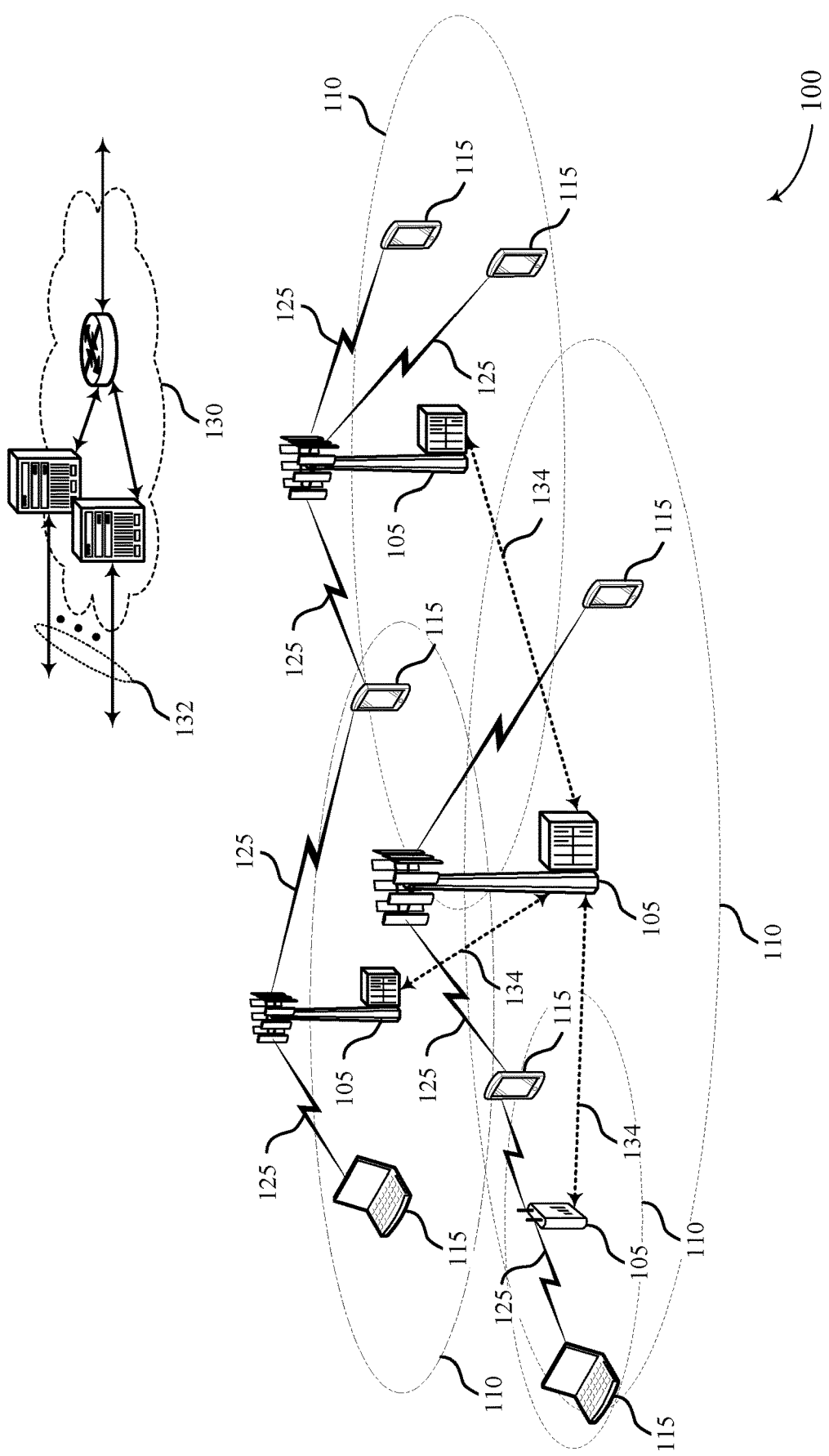
FIG. 1 illustrates an example of a wireless communications system in accordance with aspects of the present disclosure.

Some wireless communications systems may support wireless devices that utilize multiple antennas for the transmission and reception of wireless signals. For example, base stations and user equipment (UE) may have two or more antennas used for wireless communications. However, in some examples, signals sent or received using multiple-antenna techniques may be affected by various conditions that impact communications reliability, such as fading or destructive interference by multiple signals at a receiver. As a result, various transmit diversity and receive diversity schemes may be utilized to efficiently overcome any degradation of signals resulting from multiple-antenna communications.

A UE may transmit uplink control information (UCI) to a base station, and the UCI may be used to provide feedback (e.g., hybrid automatic repeat request (HARQ) feedback) for received data, to provide channel quality information (CQI), to request scheduling of uplink resources for communications, and to provide other control information to the base station. An uplink control channel (e.g., a short physical uplink control channel (sPUCCH)) may be used for the transmission of UCI. In some examples, the UCI may comprise one or two bits transmitted in sPUCCH, and a transmission scheme for the sPUCCH may be sequence-based (i.e., a sequence-based sPUCCH). A sequence-based transmission may include the transmission of a sequence that may not include any spreading or scrambling prior to transmission on a set of resources. In some examples, sequence-based transmissions may not have any distinction between different types of signals included in the sequence, such as a distinction between data and reference signals. Instead, one sequence may be provided for all information carried in the transmission. In some aspects, a sequence-based sPUCCH may omit a reference signal (such as a demodulation reference signal (DMRS)) and the sequence-based sPUCCH may include a single sequence that provides all of the information conveyed by the sPUCCH, including UCI. Transmit diversity schemes for sequence-based transmissions from multiple transmit antennas, including sPUCCH and other uplink sequences, may be utilized to enable reliable transmissions from a UE.

As described herein, a UE may use various transmit diversity schemes for transmitting uplink sequences to a base station. For instance, the UE may use different transmit antennas for transmitting respective sequences. In another example, the UE may transmit the uplink sequence using different time or frequency resources, for example, where different transmit antennas transmit the uplink sequence on different resource blocks (RBs). Additionally, the UE may use some combination of transmit diversity schemes for sequence-based transmissions. The transmit diversity scheme used for sending the sequence-based transmission may vary based on a number of symbol periods used to transmit the uplink sequence.

Aspects of the disclosure are initially described in the context of a wireless communications system. Examples are also provided that describe transmit diversity schemes that provide enhanced reliability for sequence-based transmissions. Aspects of the disclosure are further illustrated by and described with reference to apparatus diagrams, system diagrams, and flowcharts that relate to transmit diversity schemes for uplink sequence transmissions.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a 5th Generation (5G)/ New Radio (NR) network. In some aspects, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 that communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network that different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some aspects, UEs 115 may be designed to support critical functions (e.g., mission critical functions), and wireless communications system 100 may be configured to provide ultra-reliable communications for these functions.

In some examples, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some examples, groups of UEs 115 communicating via D2D communications may utilize a one-to-many (1:M) system where each UE 115 transmits to every other UE 115 in the group. In some examples, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands that may be used opportunistically by devices that can tolerate interference from other users.

Wireless communications system 100 may also operate in an extremely high frequency (EHF) region of the spectrum (e.g., from 25 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. This may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas that may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include signals being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on signals transmitted in different beam directions. For example, a UE 115 may receive one or more of the signals transmitted by the base station 105 in different directions, and the UE 115 may report to the base station 105 an indication of the signal it received with a highest signal quality, a highest signal-to-noise ratio, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based at least in part on listening according to multiple beam directions).

In some examples, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

A physical uplink control channel (PUCCH) or sPUCCH may be mapped to a control channel defined by a code and consecutive resource blocks. In some examples, sPUCCH may be a sequence-based signal, where there may not be a differentiation between different signal types within the sPUCCH. In some examples, a sequence-based sPUCCH may be transmitted as a sequence that omits a DMRS. Uplink control signaling may depend on the presence of timing synchronization for a cell. In some examples, PUCCH resources for SR and CQI reporting may be assigned (and revoked) through radio resource control (RRC) signaling. Resources for SR may be assigned after acquiring synchronization through a random access channel (RACH) procedure. In other cases, an SR may not be assigned to a UE 115 through the RACH (i.e., synchronized UEs 115 may or may not have a dedicated SR channel). sPUCCH resources for SR and CQI may be lost when the UE 115 is no longer synchronized. Certain UCI, e.g., ACK/NACK, CQI, and scheduling information may be transmitted on PUCCH and sPUCCH.

In some examples, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some examples perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some examples, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some examples, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, that may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some examples a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs). In some cases, an sTTI may have a different numerology (e.g., waveform numerology) than other TTIs, such as a different subcarrier spacing than a 1 ms TTI. As an example, a subcarrier spacing of a TTI may be based on various propagation characteristics, such as delay spread and Doppler spread, and may also change with cell size. Accordingly, different TTIs may utilize different waveform numerologies to account for such characteristics.

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature that may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some examples, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some examples, an eCC may utilize a different symbol duration than other CCs, which may include use of a reduced symbol duration as compared with symbol durations of other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some examples, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may support the use of transmit diversity schemes used for sending sequence-based signals over multiple antennas. For instance, a UE 115 may determine to transmit an uplink sequence (e.g., a sPUCCH) or other sequence-based transmissions) to a base station 105. The UE 115 may thus utilize a transmit diversity scheme for the multiple-antenna transmission of the uplink sequence. The transmit diversity scheme may be based on a number of symbol periods during which the sequence is transmitted. In accordance with the transmit diversity scheme, the UE may use multiple transmit antennas to transmit a different sequence from respective antennas. In other examples, the UE 115 may transmit the uplink sequence using different time or frequency resources, for example, where different transmit antennas transmit the uplink sequence on different RBs. Additionally, the UE 115 may use a combination of different transmit diversity schemes for sequence-based signals. In some aspects, the base station 105 may provide an indication of the transmit diversity scheme that the UE 115 is to use for transmitting the uplink sequence.

Figure 2:
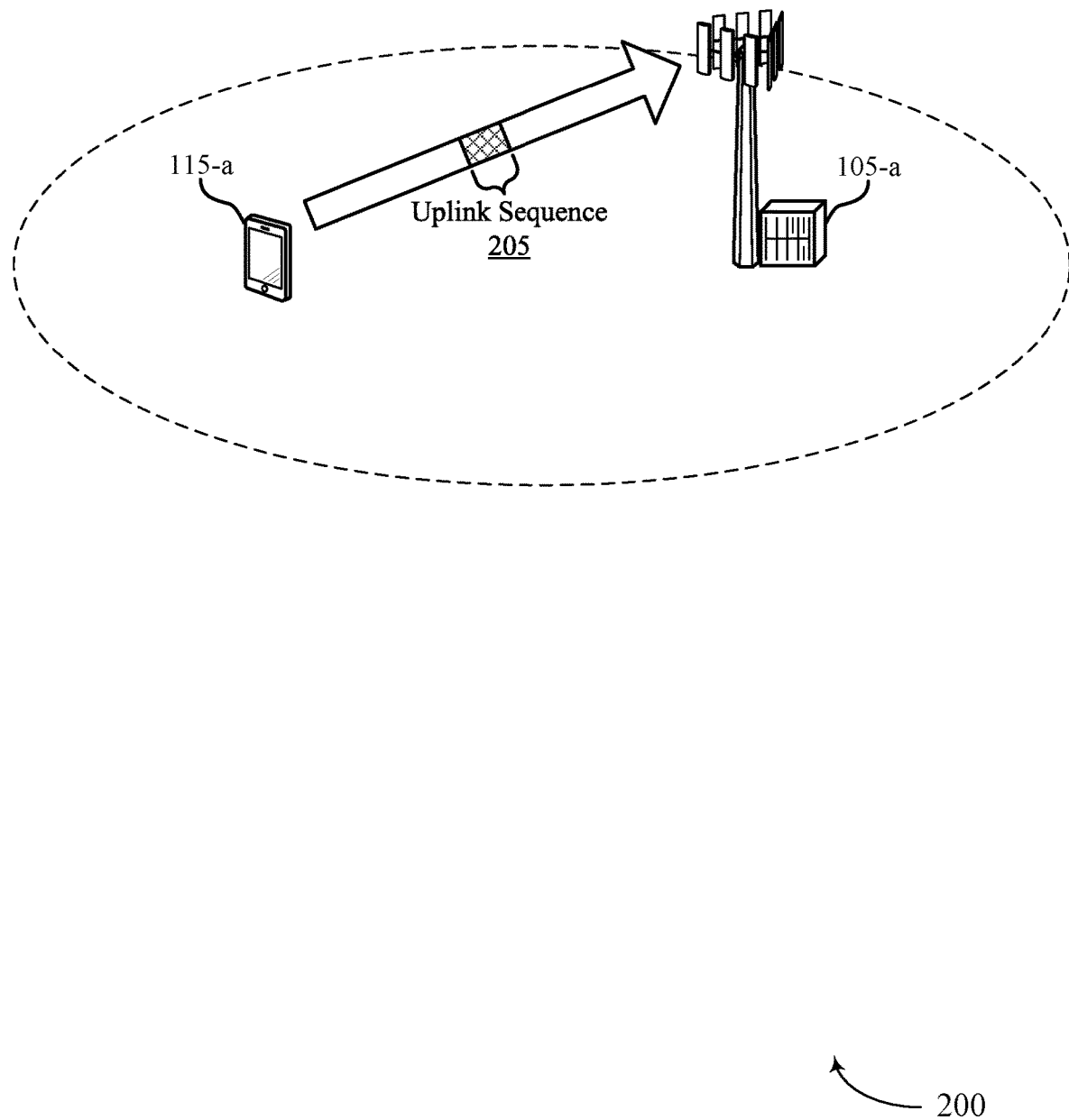
FIG. 2 illustrates an example of a wireless communications system in accordance with aspects of the present disclosure.

FIG. 2 illustrates an example of a wireless communications system 200 in accordance with various aspects of the present disclosure. In some examples, wireless communications system 200 may implement aspects of wireless communications system 100. For example, wireless communications system may include a base station 105-a and a UE 115-a, which may be examples of the corresponding devices described with reference to FIG. 1. Wireless communications system 200 may support the use of various transmissions schemes for the transmission of uplink sequences (e.g., a sequence-based sPUCCH, or other sequence-based transmissions) using multiple transmit antennas.

When communicating with base station 105-a, UE 115-a may transmit an uplink sequence 205 to base station 105-a. For example, UE 115-a may transmit UCI including HARQ feedback, CQI, SR, or other control information using uplink sequence 205 (e.g., a sPUCCH, where a transmission scheme for the sPUCCH may be sequence-based). In some cases, the UCI transmitted using uplink sequence 205 may comprise one or two information bits. Sequence-based transmissions may not have any distinction between different types of signals included in the sequence, such as a distinction between data and reference signals. Instead, one sequence may be provided for all information carried in the transmission. In some aspects, a sequence-based sPUCCH may omit a reference signal (such as a DMRS) and the sequence-based sPUCCH may include a single sequence that provides all of the information conveyed by the sPUCCH, including UCI. In some examples, uplink sequence 205 may be transmitted over one or two OFDM symbol periods. Transmit diversity schemes for sequence-based transmissions, including sPUCCH and other types of uplink sequences, from multiple transmit antennas at UE 115-a may be utilized to enable reliable reception of uplink sequence 205 from a UE 115-a.

In some examples, UE 115-a may use various transmit diversity schemes for transmitting uplink sequence 205 to base station 105-a. For instance, UE 115-a may use a transmit diversity scheme that enables the use of respective transmit antennas to transmit different uplink sequences 205. In some aspects, the different uplink sequences 205 may include different base sequences, or may include different shifts of the same base sequence (e.g., time-domain shifts, frequency-domain phase rotations, etc.). Alternatively, different sequences transmitted using the respective antennas may have a relationship that further enhances transmit diversity. For instance, and as described in further detail below, two different sequences comprising uplink sequence 205 may form an Alamouti pair that may reduce a peak-to-average power ratio (PAPR) for the transmission of uplink sequence 205.

UE 115-a may use a transmit diversity scheme that includes transmitting uplink sequence 205 using different resources. For example, respective transmit antennas may be used to send uplink sequence 205 on different time or frequency resources. In such cases, a first transmit antenna may be used to send uplink sequence 205 on a first resource block (RB) and a second transmit antenna may be used to send uplink sequence 205 on a second, different, RB. In other aspects, respective portions of uplink sequence 205 may be sent on different time resources (e.g., during different OFDM symbol periods). Additionally or alternatively, UE 115-a may use a combination of transmit diversity schemes for sequence-based transmissions. As an example, UE 115-a may transmit different sequences (e.g., different base sequences or different shifts) of uplink sequence 205 in addition to transmitting these sequences on distinct time and/or frequency resources via respective transmit antennas.

The transmit diversity scheme used by UE 115-a may vary when uplink sequence 205 is transmitted over different symbol periods. That is, the transmit diversity scheme used by UE 115-a may be based on a number of symbol periods during which uplink sequence 205 is transmitted. For instance, when transmitting a one-symbol sPUCCH, UE 115-*a* may use a first transmit diversity scheme, whereas a second transmit diversity scheme may be used when transmitting a two-symbol sPUCCH. UE 115-*a* may use the various techniques described herein for each of the first and second transmit diversity schemes, including the transmission of different sequences using different antennas, or transmission on different resources using the different antennas, or any combination thereof.

The transmit diversity scheme used by UE 115-*a* may be known by base station 105-*a* for efficient reception and subsequent decoding of the transmitted uplink sequence 205. Accordingly, base station 105-*a* may transmit an indication of the transmit diversity scheme that UE 115-*a* may use for transmitting uplink sequence 205. In some aspects, the transmit diversity scheme may be preconfigured. For example, the transmit diversity scheme may be based on a deployment type of UE 115-*a* or a capability of UE 115-*a*, or other factors. In some aspects, base station 105-*a* may transmit an indication of a set of preconfigured transmit diversity schemes, and UE 115-*a* may select the transmit diversity scheme to be used. Additionally, base station 105-*a* may provide an indication of one or more parameters associated with the transmit diversity schemes used by UE 115-*a*. For instance, base station 105-*a* may provide an indication of a certain sequence or RB to use when transmitting uplink sequence 205 (e.g., base station 105-*a* may indicate a particular sequence to use for uplink sequence 205 when UE 115-*a* is transmitting an Alamouti pair). The signaling of the transmit diversity scheme by base station 105-*a* may be sent via control signaling (e.g., using a downlink control channel, such as physical downlink control channel (PDCCH) or short PDCCH (sPDCCH)) or via other types of signaling (e.g., RRC messaging). Base station 105-*a* may thus configure the transmit diversity scheme used by UE 115-*a* for the transmission of uplink sequence 205.

Figure 3:
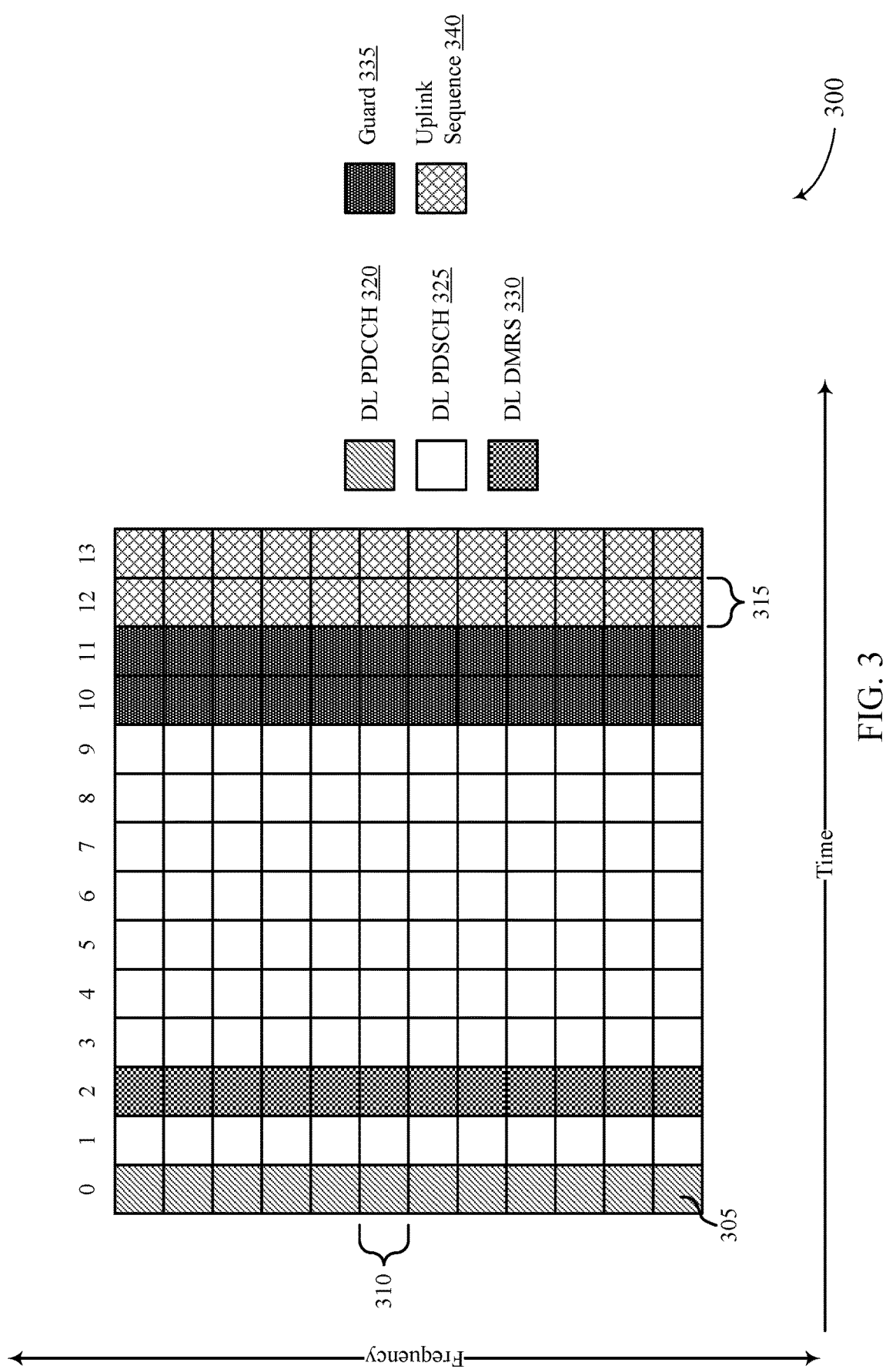
FIG. 3 illustrates an example of a subframe structure in accordance with aspects of the present disclosure.

FIG. 3 illustrates an example of a subframe structure 300 in accordance with various aspects of the present disclosure. Subframe structure 300 may include time-frequency resources 305 that may be transmitted over multiple radio frequency (RF) spectrum bands 310 (or tones, sub-carriers, sub-bands, etc.) and during multiple (e.g., 14) symbol periods 315. Additionally, subframe structure 300 may be used by a UE 115 and base station 105 when communicating with each other. Subframe structure 300 may support different regions during which certain types of signals or sequences may be transmitted by wireless devices.

As an example, subframe structure 300 may include one or more symbol periods 315 designated for the transmission of downlink control information (e.g., PDCCH 320), downlink data (e.g., physical downlink shared channel (PDSCH) 325), and downlink reference signals (e.g., downlink DMRS 330). Subframe structure 300 may also include a guard period 335 of one or more symbol periods 315 that may allow for switching between downlink and uplink transmissions. Accordingly, subframe structure 300 may include a region of one or more symbol periods 315 that may be used for the transmission of a sequence-based transmissions, such as uplink sequence 340, which may include control information. For instance, UCI may be transmitted using a one-symbol or two-symbol sequence-based sPUCCH. The UCI may be one or two bits within the sPUCCH.

As described above, and provided in further detail below, a UE 115 may transmit uplink sequence 340 using two or more antennas using various transmit diversity schemes. In such cases, the use of transmit diversity schemes may provide for robust uplink sequence-based transmissions via multiple antennas, and may ensure reliable receipt of, for example, UCI by a base station 105. Additionally, the UE 115 may use different transmit diversity schemes based on a number of symbol periods 315 during which uplink sequence 340 is transmitted. For example, the UE 115 may transmit uplink sequence 340 using respective transmit antennas during a single symbol period 315, but using different resources 305 (or different sets of RF spectrum bands 310, etc.). In other examples, the UE 115 may transmit a two-symbol sPUCCH using a repetition of the one-symbol sPUCCH, where different antennas may be used to transmit instances of the one-symbol sPUCCH during respective symbol periods 315. In any case, transmit diversity may be achieved by the UE 115 through the transmission of the same or different sequences, during the same or different symbol periods 315, or a combination thereof, using different transmit antennas.

Figure 4:
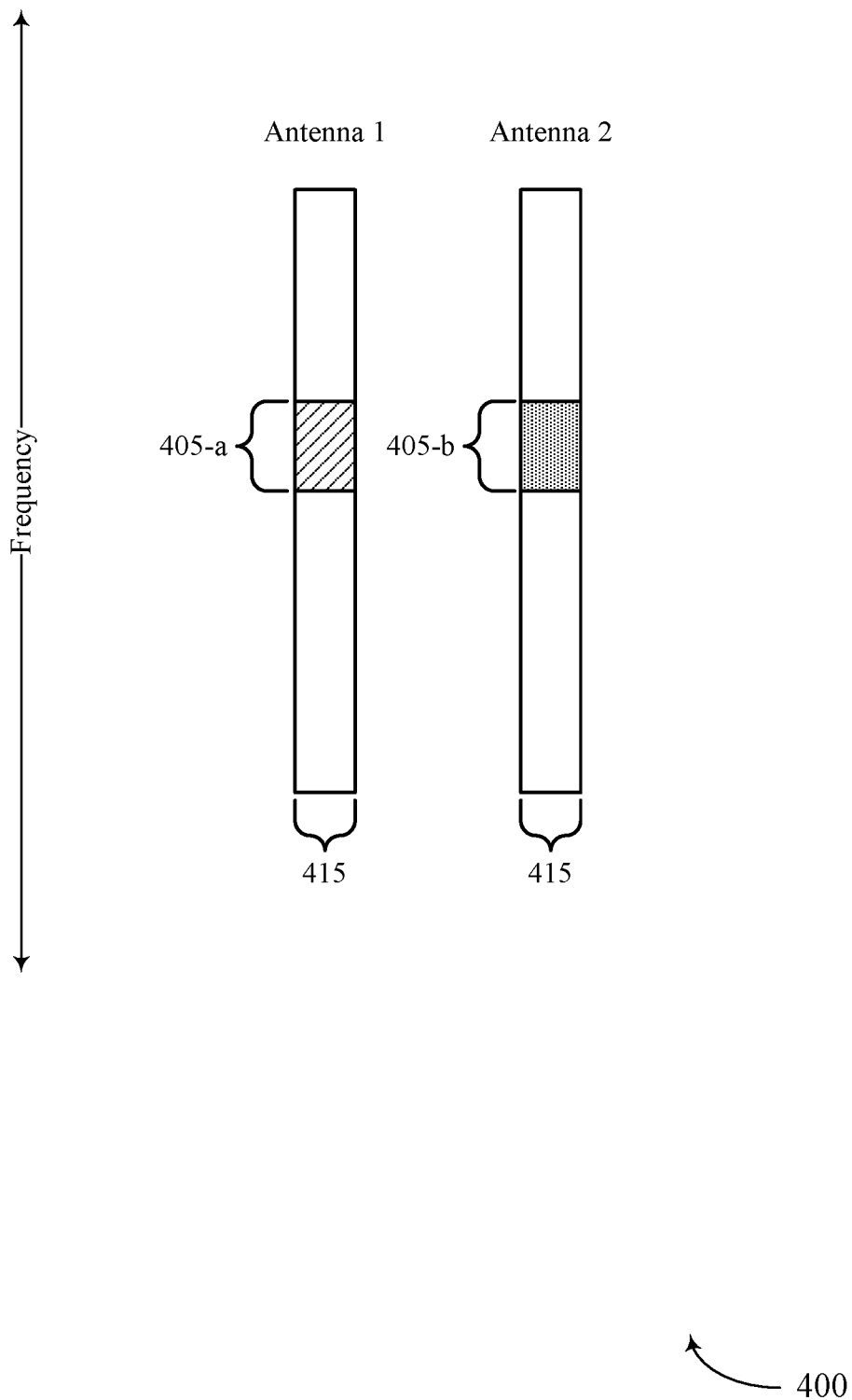
FIGS. 4 through 7 illustrate examples of transmit diversity schemes in accordance with aspects of the present disclosure.

FIG. 4 illustrates an example of a transmit diversity scheme 400 in accordance with various aspects of the present disclosure. Transmit diversity scheme 400 may be used by a UE 115 for the transmission of an uplink sequence that may include UCI. For example, the UE 115 may use transmit diversity scheme 400 with the subframe structure 300 described with reference to FIG. 3 to achieve transmit diversity. However, it is understood that transmit diversity scheme 400 may be used separate from subframe structure 300 or used with other subframe or TTI structures (e.g., any time UE 115 is transmitting a sequence-based transmission). Further, while the examples provided below are described with reference to a sequence-based sPUCCH, the transmit diversity schemes described herein may be used with the transmission of other sequence-based signals.

Transmit diversity scheme 400 may illustrate an example of techniques used for the transmission of a one-symbol sequence-based sPUCCH using respective transmit antennas. For example, transmit diversity scheme may include the transmission of a first sPUCCH sequence 405-*a* using a first antenna and transmission of a second sPUCCH sequence 405-*b* using a second antenna, where the first sPUCCH sequence 405-*a* and the second sPUCCH sequence 405-*b* are transmitted during the same symbol period 415. In some aspects, a base sequence of first sPUCCH sequence 405-*a* may differ from a base sequence of second sPUCCH sequence 405-*b*. Alternatively, first sPUCCH sequence 405-*a* and second sPUCCH sequence 405-*b* may share a same base sequence, but may have different shifts. For example, the base sequence of the first sPUCCH sequence 405-*a* may be shifted in time (e.g., have a cyclic shift) or shifted in frequency (e.g., have a phase rotation) from the base sequence of second sPUCCH sequence 405-*b*. In other examples, the base sequences may have a combination of time and frequency domain shifts. Such techniques may be extended to more than the two transmit antennas illustrated, with any number or combination of antennas used for transmitting one or more sequence-based sPUCCH.

Figure 5:
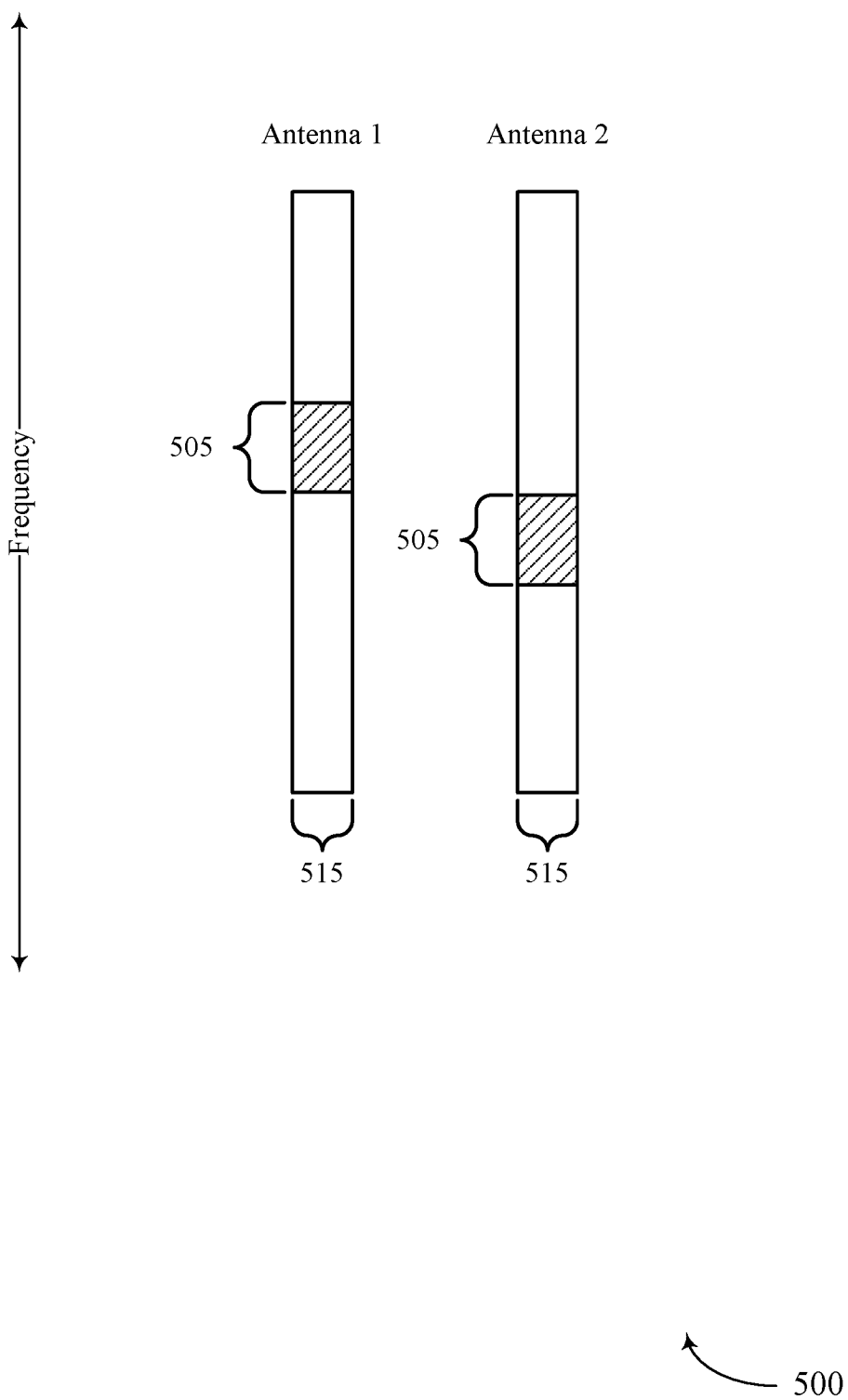

FIG. 5 illustrates an example of a transmit diversity scheme 500 in a system in accordance with various aspects of the present disclosure. Transmit diversity scheme 500 may be used by a UE 115 for the transmission of an uplink sequence that may include UCI. For example, the UE 115 may use transmit diversity scheme 500 with the subframe structure 300 described with reference to FIG. 3 to achieve transmit diversity. However, it is understood that transmit diversity scheme 500 may be used separate from subframe structure 300 or used with other subframe or TTI structures (e.g., any time UE 115 is transmitting a sequence-based transmission). Further, while the examples provided below are described with reference to a sequence-based sPUCCH, the transmit diversity schemes described herein may be used with the transmission of other sequence-based signals.

Transmit diversity scheme 500 may illustrate an example of techniques used for the transmission of a one-symbol sequence-based sPUCCH using respective transmit antennas. For example, transmit diversity scheme 500 may include the transmission of a first sPUCCH sequence 505 using a first antenna, as well as the transmission of the first sPUCCH sequence 505 using a second antenna. The first sPUCCH sequence 505 may be transmitted during the same symbol period 515 by both antennas. That is, the same sPUCCH sequence 505 may be simultaneously sent by different antennas. In some aspects, the sPUCCH sequence 505 may be transmitted on different resources (e.g., RBs) by the different transmit antennas. Accordingly, the transmission of sPUCCH sequence 505 using a first antenna may not overlap (in frequency) with the transmission of sPUCCH sequence 505 using a second antenna.

Additionally, the UE 115 may combine aspects of transmit diversity scheme 500 and transmit diversity scheme 400 described above with reference to FIG. 4. For example, the transmission of sPUCCH sequence 505 using the second antenna may utilize a different set of resources and may also include a different base sequence from the sPUCCH sequence 505 transmitted using the first antenna. Alternatively, there may be a time and/or frequency shift of a base sequence associated with the sPUCCH sequence 505 transmitted on different antennas. Such techniques may be extended to more than the two transmit antennas illustrated, with any number or combination of antennas used for sending one or more sequence-based sPUCCH.

Figure 6:
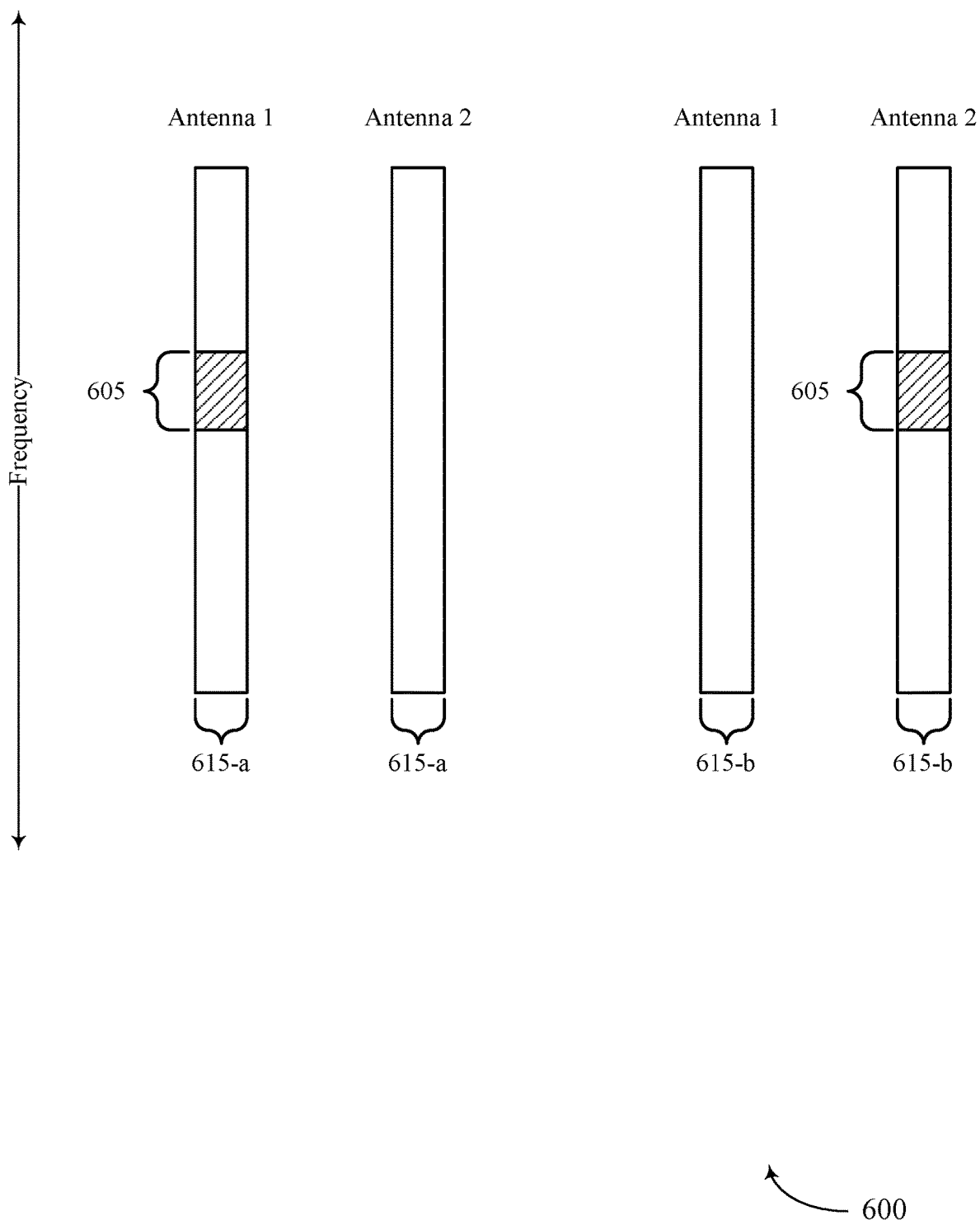

FIG. 6 illustrates an example of a transmit diversity scheme 600 in a system in accordance with various aspects of the present disclosure. Transmit diversity scheme 600 may be used by a UE 115 for the transmission of an uplink sequence that may include UCI. For example, the UE 115 may use transmit diversity scheme 600 with the subframe structure 300 described with reference to FIG. 3 to achieve transmit diversity. However, it is understood that transmit diversity scheme 600 may be used separate from subframe structure 300 or used with other subframe or TTI structures (e.g., any time UE 115 is transmitting a sequence-based transmission). Further, while the examples provided below are described with reference to a sequence-based sPUCCH, the transmit diversity schemes described herein may be used with the transmission of other sequence-based signals.

Transmit diversity scheme 600 may illustrate an example of techniques used for the transmission of a two-symbol sequence-based sPUCCH using respective transmit antennas. For example, transmit diversity scheme 600 may include the transmission of a sPUCCH sequence 605 during a first symbol period 615-*a* and using a first transmit antenna. Transmit diversity scheme 600 may also include the transmission of the sPUCCH sequence 605 during a second symbol period 615-*b* (e.g. immediately following first symbol period 615-*a*) and using a second transmit antenna. In other words, the second transmit antenna refrains from transmitting the sPUCCH sequence 605 during the first symbol period 615-*a* while the first transmit antenna is transmitting the sPUCCH sequence 605. Then the first transmit antenna refrains from transmitting the sPUCCH sequence 605 during the second symbol period 615-*b* while the second antenna is transmitting the sPUCCH sequence 605. As a result, the same sPUCCH sequence 605 may be sent by different antennas at different times.

Alternatively, transmit diversity scheme 600 may be used for the transmission of different portions of sPUCCH sequence 605 during different symbol periods 615. That is, a first portion of sPUCCH sequence 605 may be transmitted during first symbol period 615-*a* by a first transmit antenna, and a second portion of sPUCCH sequence 605 may be transmitted during second symbol period 615-*b* by a second, different, transmit antenna. In some cases, the first and second portion of sPUCCH sequence 605 may be the same. In some aspects, the transmission of different portions of sPUCCH sequence 605 by different antennas may also use frequency hopping or sequence hopping. Accordingly, transmissions of portions of sPUCCH sequence 605 using respective transmit antennas may have a different base sequence, a shift of the base sequence, or be transmitted on different time-frequency resources. Additionally, these techniques may be extended to more than two transmit antennas, with any number or combination of antennas used for sending one or more sequence-based sPUCCH.

In some aspects, transmit diversity schemes for two-symbol sPUCCH transmission may comprise a repetition of transmit diversity schemes used for one-symbol sPUCCH transmissions described above. For example, the transmission of a one-symbol sPUCCH sequence (e.g., using a one-symbol sPUCCH transmit diversity scheme) may be repeated over multiple symbol periods. In such cases, an initial sequence-based sPUCCH and/or the repetition of the sequence-based sPUCCH may be sent on different frequency resources by respective antennas, have different base sequences for the respective transmissions, or have the same base sequence with different shifts, etc. In some examples, an sPUCCH sequence 605 may be transmitted using frequency hopping during one or more symbol periods, or sequence hopping may be used for separate transmissions of sPUCCH sequences 605 by different antennas during a second symbol period.

Figure 7:
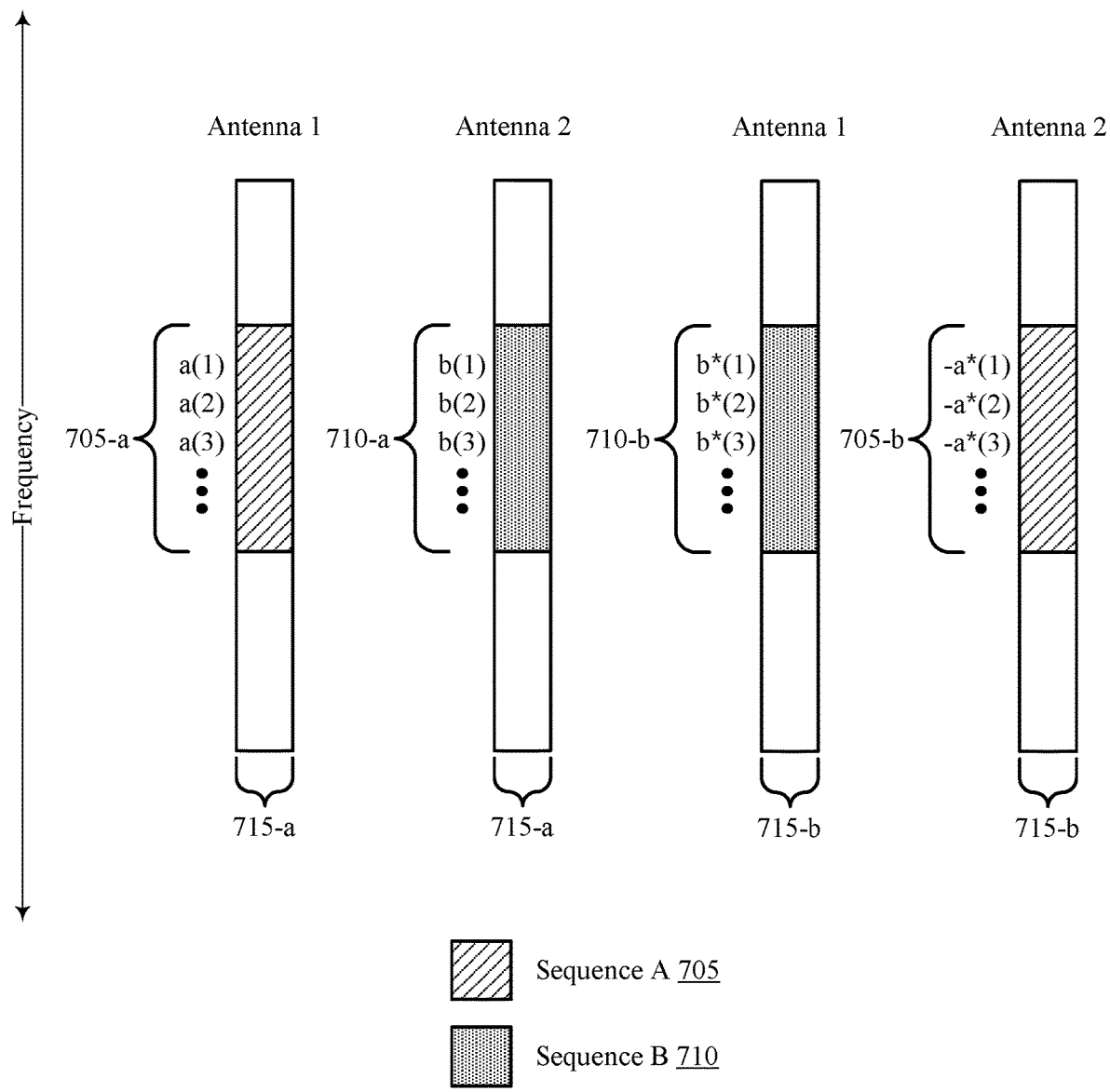

FIG. 7 illustrates an example of a transmit diversity scheme 700 in accordance with various aspects of the present disclosure. Transmit diversity scheme 700 may be used by a UE 115 for the transmission of an uplink sequence that may include UCI. For example, the UE 115 may use transmit diversity scheme 700 with the subframe structure 300 described with reference to FIG. 3 to achieve transmit diversity. However, it is understood that transmit diversity scheme 700 may be used separate from subframe structure 300 or used with other subframe or TTI structures (e.g., any time UE 115 is transmitting a sequence-based transmission). Further, while the examples provided below are described with reference to a sequence-based sPUCCH, the transmit diversity schemes described herein may be used with the transmission of other sequence-based signals.

Transmit diversity scheme 700 may illustrate an example of techniques used for used for the transmission of a two-symbol sequence-based sPUCCH using respective transmit antennas. Transmit diversity scheme 700 may include the transmission of a sPUCCH sequence during different symbol periods 715, where different antennas transmit different sequences associated with the sPUCCH sequence (e.g., sequence A 705 and sequence B 710). In some aspects, sequence A 705 and sequence B 710 may be transmitted in such a manner that the respective sequences form an Alamouti pair.

For example, a first transmit antenna may send a first transmission of sequence A 705-*a*, including various components of sequence A 705 (e.g., a(1), a(2), a(3), and so on), where the first transmission of sequence A 705-*a* may be transmitted during a first symbol period 715-*a*. Also during the first symbol period 715-*a*, a second transmit antenna may be used to send a first transmission of sequence B 710-*a* that includes components of sequence B 710 (e.g., b(1), b(2), b(3), and so on).

During a subsequent symbol period 715-*b*, the first transmit antenna may then send a second transmission of sequence B 710-*b* that includes the conjugate of the components of sequence B 710. That is, the second transmission of sequence B 710-*b* may include b*(1), b*(2), b*(3), etc., which may be transmitted on the first transmit antenna. Further, the second antenna may transmit, during second symbol period 715-*b*, a second transmission of sequence A 705-*b* including a negative conjugate of the components of sequence A 705 (e.g., -a*(1), -a*(2), -a*(3), and so on). Thus, the different transmissions of these sequences (first transmission of sequence A 705-*a*, second transmission of sequence A 705-*b*, first transmission of sequence B 710-*a*, and second transmission of sequence B 710-*b*) may form an Alamouti pair when transmitted over symbol periods 715-*a* and 715-*b* (which may be consecutive OFDM symbol periods). In such examples, the time-domain signal from the first transmit antenna (during first symbol period 715-*a*) and the time-domain signal from the second transmit antenna (during second symbol period 715-*b*) may have a same PAPR. Likewise, the time-domain signal from the second transmit antenna (during first symbol period 715-*a*) and the time-domain signal from the first transmit antenna (during second symbol period 715-*b*) also have a same PAPR. As a result, transmit diversity scheme 700 may enable reduced PAPR for the transmission of sequence-based signals.

Figure 8:
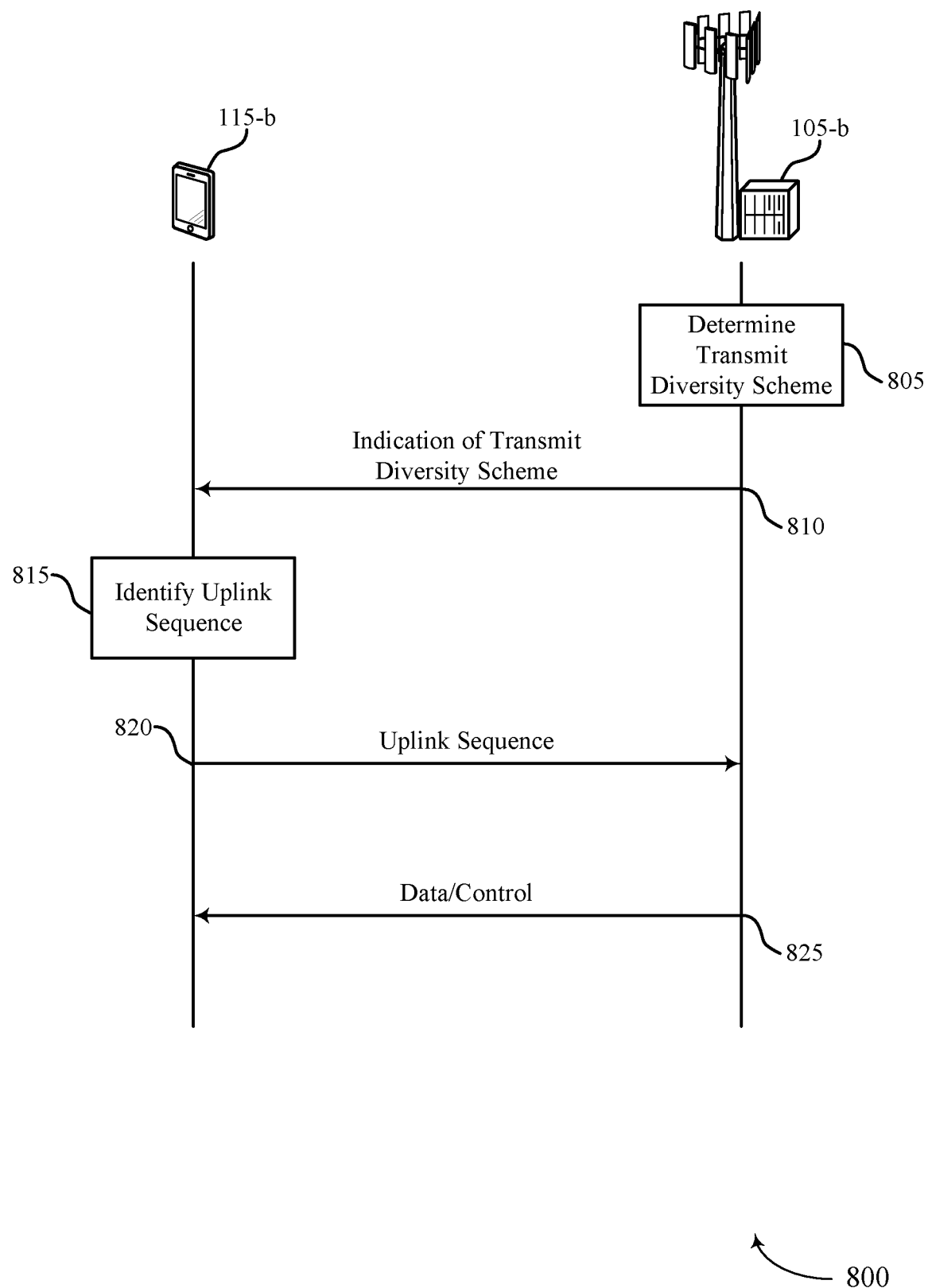
FIG. 8 illustrates an example of a process flow in accordance with aspects of the present disclosure.

FIG. 8 illustrates an example of a process flow 800 in accordance with various aspects of the present disclosure. In some examples, process flow 800 may implement aspects of wireless communications system 100 and wireless communications system 200. For example, process flow 800 includes a UE 115-*b* and base station 105-*b*, which may be examples of the corresponding devices described with reference to FIGS. 1 and 2. Process flow 800 may illustrate techniques that enable transmit diversity for sequences or sequence-based signals transmitted using multiple antennas.

At 805, base station 105-*b* may determine a transmit diversity scheme for receiving an uplink sequence from UE 115-*b*. In some aspects, the transmit diversity scheme may be based on a number of symbol periods used by UE 115-*b* to transmit the uplink sequence. In some aspects, the uplink sequence includes a sequence-based sPUCCH, and the sequence-based sPUCCH may further include one-bit uplink control information or two-bit uplink control information. In some examples, determining the transmit diversity scheme for the uplink sequence includes selecting the transmit diversity scheme from a set of preconfigured transmit diversity schemes.

At 810, base station may transmit, and UE 115-*b* may receive, an indication of the transmit diversity scheme for transmitting the uplink sequence. This communication of the transmit diversity scheme between base station 105-*b* and UE 115-*b* may enable both devices to coherently communicate with each other when various transmit diversity scheme are available or in use (e.g., based on UE capabilities or type of deployment for UE 115-*b*). At 815, UE 115-*b* may identify the uplink sequence to be transmitted using a set of transmit antennas. For example, UE 115-*b* may have previously received data from base station 105-*b*, and UE 115-*b* may determine to transmit UCI including HARQ feedback for the previously-received data. Additionally or alternatively, UE 115-*b* may determine to transmit other sequence-based signals to base station 105-*b*.

At 820, UE 115-*b* may transmit, and base station 105-*b* may receive, the uplink sequence. The uplink sequence may be transmitted over the number of symbol periods using the set of transmit antennas. Additionally, the uplink sequence may be transmitted by UE 115-*b* in accordance with the indicated transmit diversity scheme. In some aspects, transmitting the uplink sequence includes transmitting a first uplink sequence using a first transmit antenna of the set of transmit antennas and transmitting a second uplink sequence using a second transmit antenna of the set of transmit antennas. The first uplink sequence and the second uplink sequence may be transmitted over a single symbol period. In such cases, the first uplink sequence and the second uplink sequence have different base sequences. Alternatively, the first uplink sequence may include a first base sequence, and the second uplink sequence may include a shift of the first base sequence, where the shift includes a time-domain cyclic shift, or a frequency-domain phase rotation, or a combination thereof.

In other examples, transmitting the uplink sequence includes transmitting the uplink sequence on a first set of resources using the first transmit antenna of the set of transmit antennas and transmitting the uplink sequence on a second set of resources using the second transmit antenna of the set of transmit antennas. The uplink sequence may be transmitted over a single symbol period in such cases. Alternatively, transmitting the uplink sequence may include transmitting the uplink sequence over a first symbol period using the first transmit antenna and transmitting the uplink sequence over a second symbol period using the second transmit antenna. In such cases, the uplink sequence may be transmitted during the first symbol period and the second symbol period using a frequency hopping pattern, or a sequence hopping pattern, or a combination thereof. In some aspects, UE 115-*b* may transmit a first uplink sequence on a first set of resources using the first transmit antenna and transmit a second uplink sequence on a second set of resources using the second transmit antenna, where the first uplink sequence and the second uplink sequence are transmitted over two symbol periods. In some examples, the first uplink sequence and the second uplink sequence form an Alamouti pair.

At 825, base station 105-*b* may respond to the uplink sequence(s) transmitted by UE 115-*b*. For example, if the uplink sequence included UCI, such as HARQ feedback, base station 105-*b* may retransmit data previously sent to UE 115-*b* based on the received feedback. In other examples, base station 105-*b* may transmit data and/or control signals to UE 115-*b* based on or in response to the received uplink sequence(s).

Figure 9:
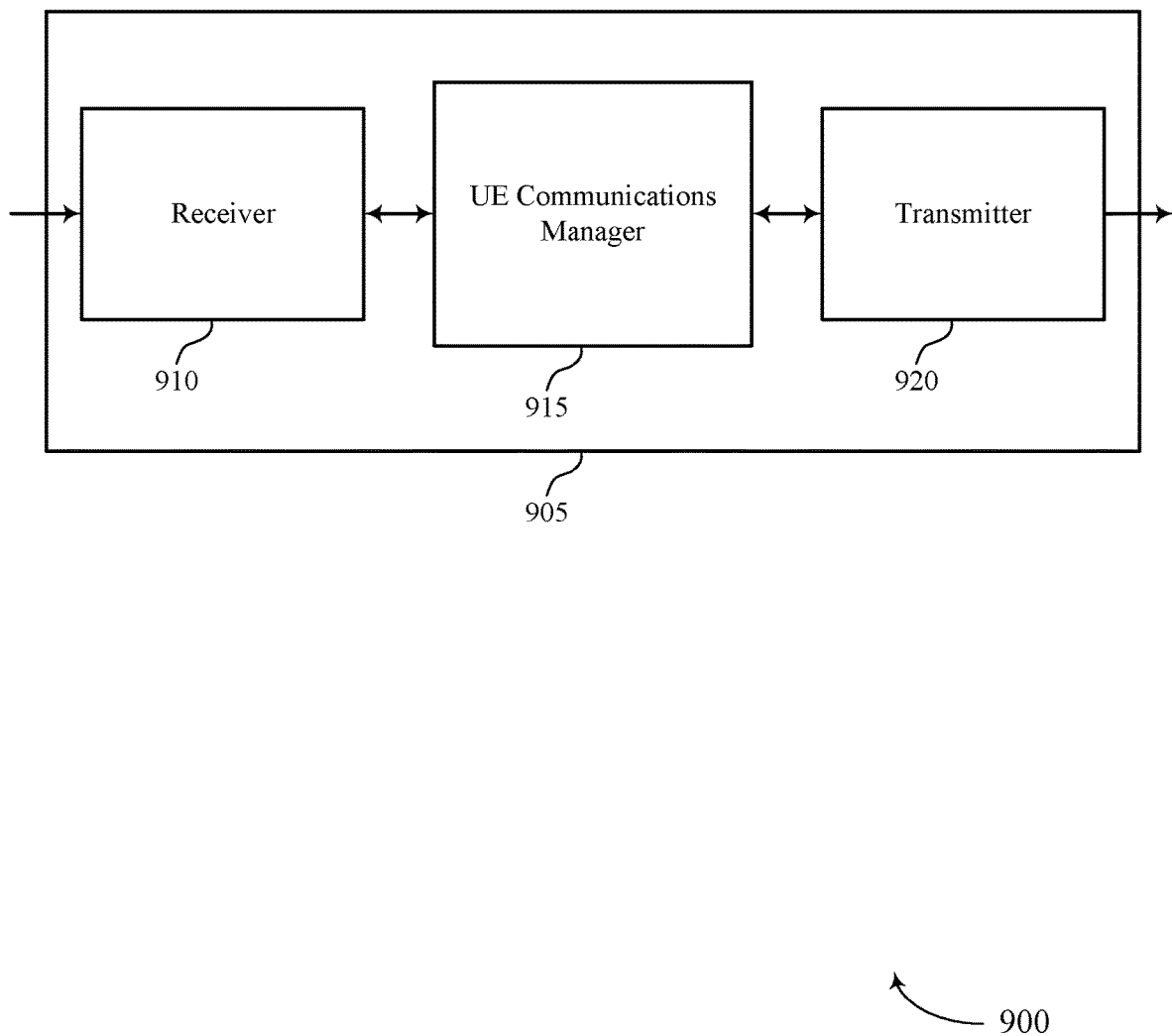
FIGS. 9 through 11 show block diagrams of a device in accordance with aspects of the present disclosure.

FIG. 9 shows a block diagram 900 of a wireless device 905 in accordance with aspects of the present disclosure. Wireless device 905 may be an example of aspects of a UE 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to transmit diversity schemes for uplink sequence transmissions, etc.). Information may be passed on to other components of the device. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12. UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

UE communications manager 915 may identify an uplink sequence for a UE 115 to transmit using a set of transmit antennas, receive an indication of a transmit diversity scheme for the uplink sequence, where the transmit diversity scheme is based on a number of symbol periods used to transmit the uplink sequence, and transmit the uplink sequence over the number of symbol periods using the set of transmit antennas, the uplink sequence being transmitted in accordance with the indicated transmit diversity scheme.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
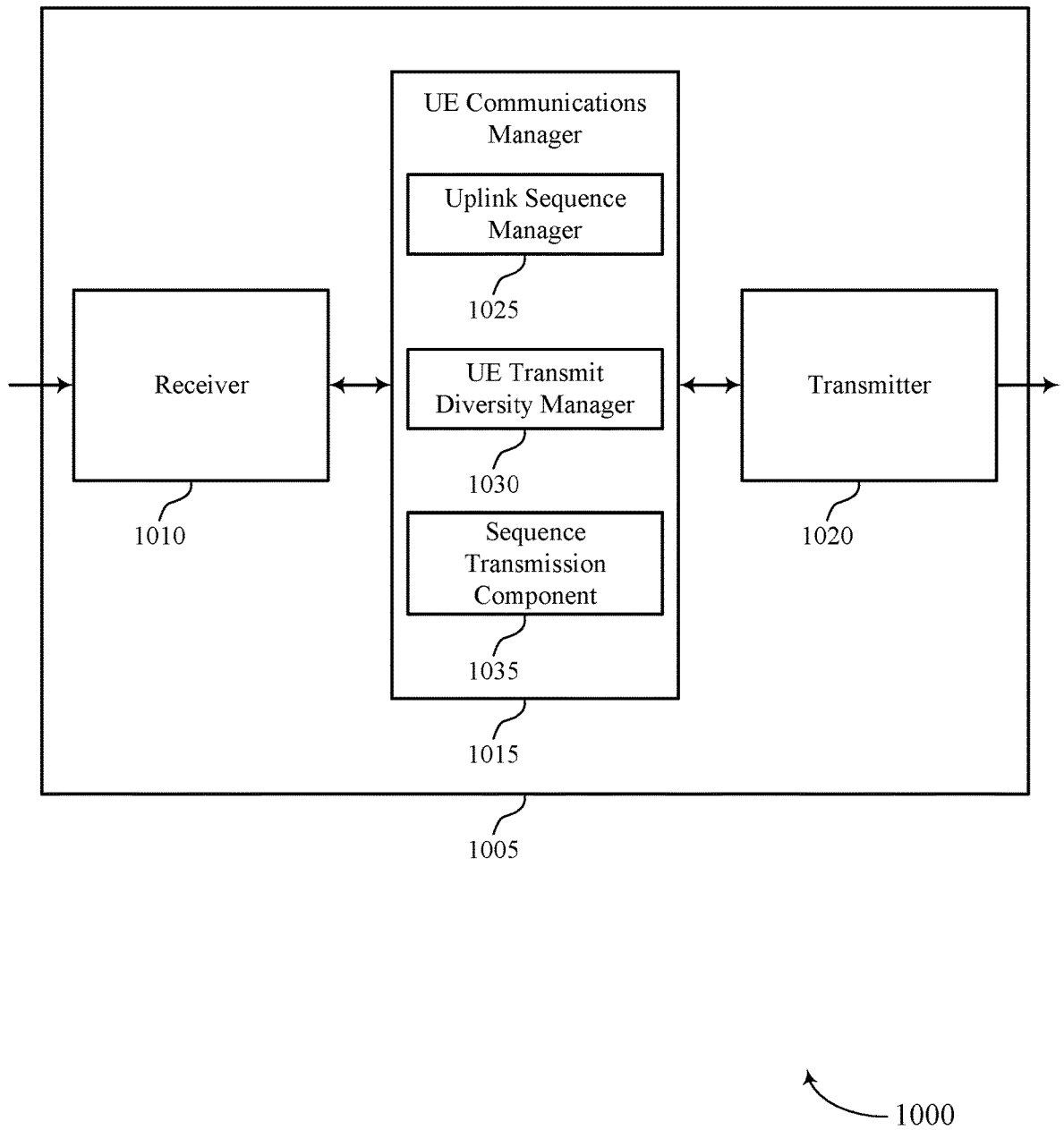

FIG. 10 shows a block diagram 1000 of a wireless device 1005 in accordance with aspects of the present disclosure. Wireless device 1005 may be an example of aspects of a wireless device 905 or a UE 115 as described with reference to FIG. 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to transmit diversity schemes for uplink sequence transmissions, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12. UE communications manager 1015 may also include uplink sequence manager 1025, UE transmit diversity manager 1030, and sequence transmission component 1035.

Uplink sequence manager 1025 may identify an uplink sequence for a UE 115 to transmit using a set of transmit antennas. In some examples, the uplink sequence includes a sequence-based short physical uplink control channel sPUCCH, and the sequence-based sPUCCH may include 1-bit uplink control information or 2-bit uplink control information.

UE transmit diversity manager 1030 may receive an indication of a transmit diversity scheme for the uplink sequence, where the transmit diversity scheme is based on a number of symbol periods used to transmit the uplink sequence. Sequence transmission component 1035 may transmit the uplink sequence over the number of symbol periods using the set of transmit antennas, the uplink sequence being transmitted in accordance with the indicated transmit diversity scheme.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
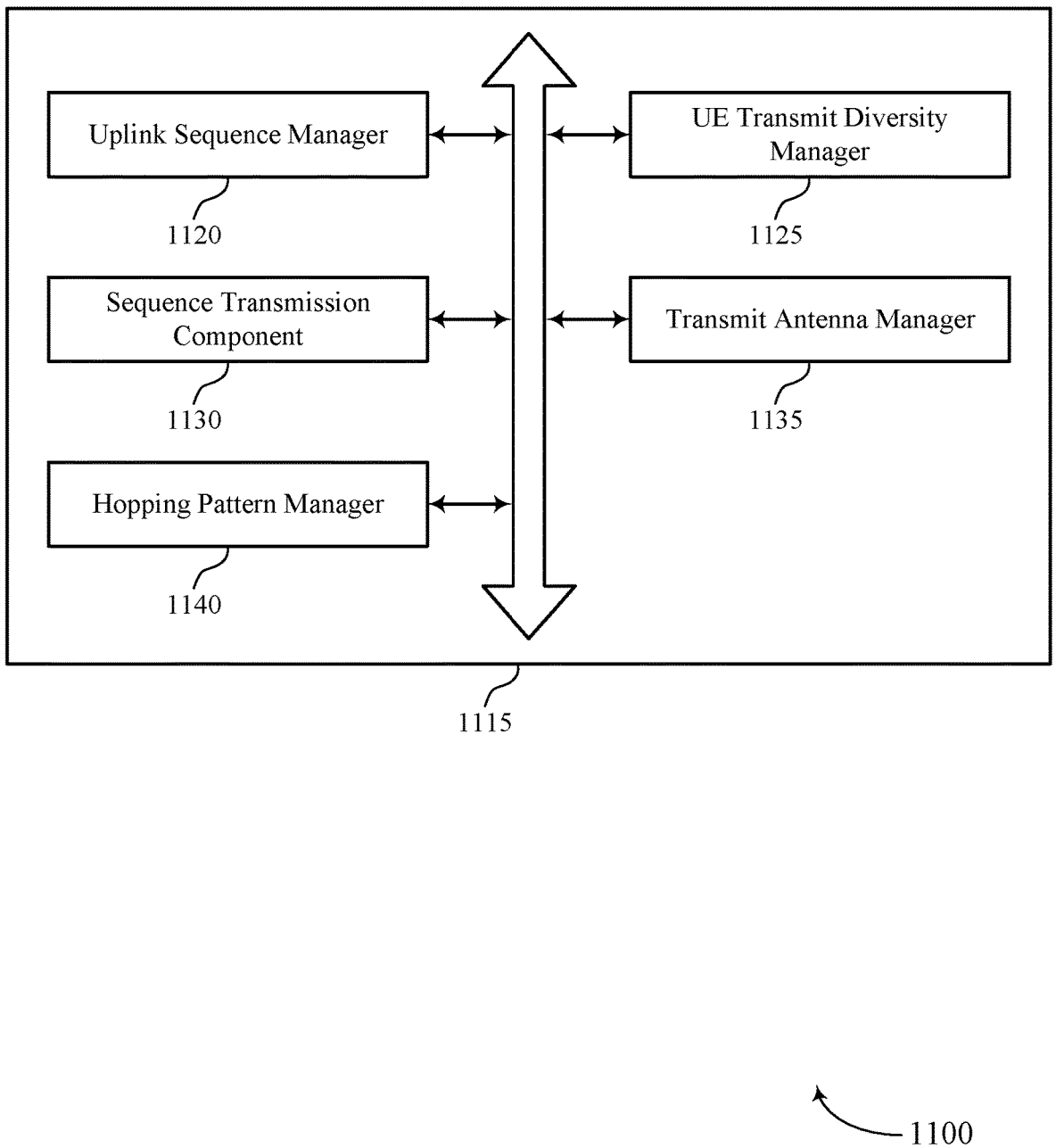

FIG. 11 shows a block diagram 1100 of a UE communications manager 1115 in accordance with aspects of the present disclosure. The UE communications manager 1115 may be an example of aspects of a UE communications manager 915, a UE communications manager 1015, or a UE communications manager 1215 described with reference to FIGS. 9, 10, and 12. The UE communications manager 1115 may include uplink sequence manager 1120, UE transmit diversity manager 1125, sequence transmission component 1130, transmit antenna manager 1135, and hopping pattern manager 1140. Each of these modules may communicate, directly or indirectly, with one another (e.g., via one or more buses).

Uplink sequence manager 1120 may identify an uplink sequence for a UE 115 to transmit using a set of transmit antennas. In some examples, the uplink sequence includes a sequence-based sPUCCH, and where the sequence-based sPUCCH further includes 1-bit uplink control information or 2-bit uplink control information.

UE transmit diversity manager 1125 may receive an indication of a transmit diversity scheme for the uplink sequence, where the transmit diversity scheme is based on a number of symbol periods used to transmit the uplink sequence. In some examples, UE transmit diversity manager 1125 may select the transmit diversity scheme from a set of preconfigured transmit diversity schemes based on the indicated transmit diversity scheme.

Sequence transmission component 1130 may transmit the uplink sequence over the number of symbol periods using the set of transmit antennas, the uplink sequence being transmitted in accordance with the indicated transmit diversity scheme. In some examples, transmitting the uplink sequence includes transmitting a first uplink sequence on a first set of resources and transmitting a second uplink sequence on a second set of resources.

Transmit antenna manager 1135 may transmit the uplink sequence on a second set of resources using a second transmit antenna of the set of transmit antennas, where the uplink sequence is transmitted over a single symbol period. In some examples, transmit antenna manager 1135 may transmit a first uplink sequence using a first transmit antenna of the set of transmit antennas, and transmit a second uplink sequence using a second transmit antenna of the set of transmit antennas, where the first uplink sequence and the second uplink sequence are transmitted over a single symbol period. In some examples, the first uplink sequence and the second uplink sequence include an Alamouti pair.

In some examples, transmit antenna manager 1135 may transmit a first portion of the uplink sequence over a first symbol period using a first transmit antenna of the set of transmit antennas, and transmit a second portion of the uplink sequence over a second symbol period using a second transmit antenna of the set of transmit antennas. Alternatively, transmit antenna manager 1135 may transmit the uplink sequence on a first set of resources using a first transmit antenna of the set of transmit antennas, and transmit the uplink sequence over a second symbol period using a second transmit antenna of the set of transmit antennas.

In some aspects, transmit antenna manager 1135 may transmit a first uplink sequence on a first set of resources using a first transmit antenna of the set of transmit antennas and transmit a second uplink sequence on a second set of resources using a second transmit antenna of the set of transmit antennas, where the first uplink sequence and the second uplink sequence are transmitted over a two symbol periods. In some examples, the first uplink sequence and the second uplink sequence include a different base sequence. In some examples, the first uplink sequence includes a first base sequence, and the second uplink sequence includes a shift of the first base sequence, where the shift includes a time domain cyclic shift, or a frequency domain phase rotation, or a combination thereof.

In some examples, transmit antenna manager 1135 may transmit a first uplink sequence using a first transmit antenna of the set of transmit antennas and transmit a second uplink sequence using a second transmit antenna of the set of transmit antennas, where the first uplink sequence and the second uplink sequence are transmitted over a first symbol period. Additionally, transmit antenna manager 1135 may transmit a repetition of the first uplink sequence using the first transmit antenna of the set of transmit antennas and transmit a repetition of the second uplink sequence using the second transmit antenna of the set of transmit antennas, where the repetition of the first uplink sequence and the repetition of the second uplink sequence are transmitted over a second symbol period. In some aspects, transmit antenna manager 1135 may transmit the first uplink sequence, or the second uplink sequence, or the repetition of the first uplink sequence, or the repetition of the second uplink sequence, or a combination thereof, using a frequency hopping pattern, or a sequence hopping pattern, or a combination thereof.

Hopping pattern manager 1140 may transmit the uplink sequence over the first symbol period and the second symbol period using a frequency hopping pattern, or a sequence hopping pattern, or a combination thereof. In some aspects, hopping pattern manager 1140 may transmit the first uplink sequence, or the second uplink sequence, or the repetition of the first uplink sequence, or the repetition of the second uplink sequence, or a combination thereof, using a frequency hopping pattern, or a sequence hopping pattern, or a combination thereof.

Figure 12:
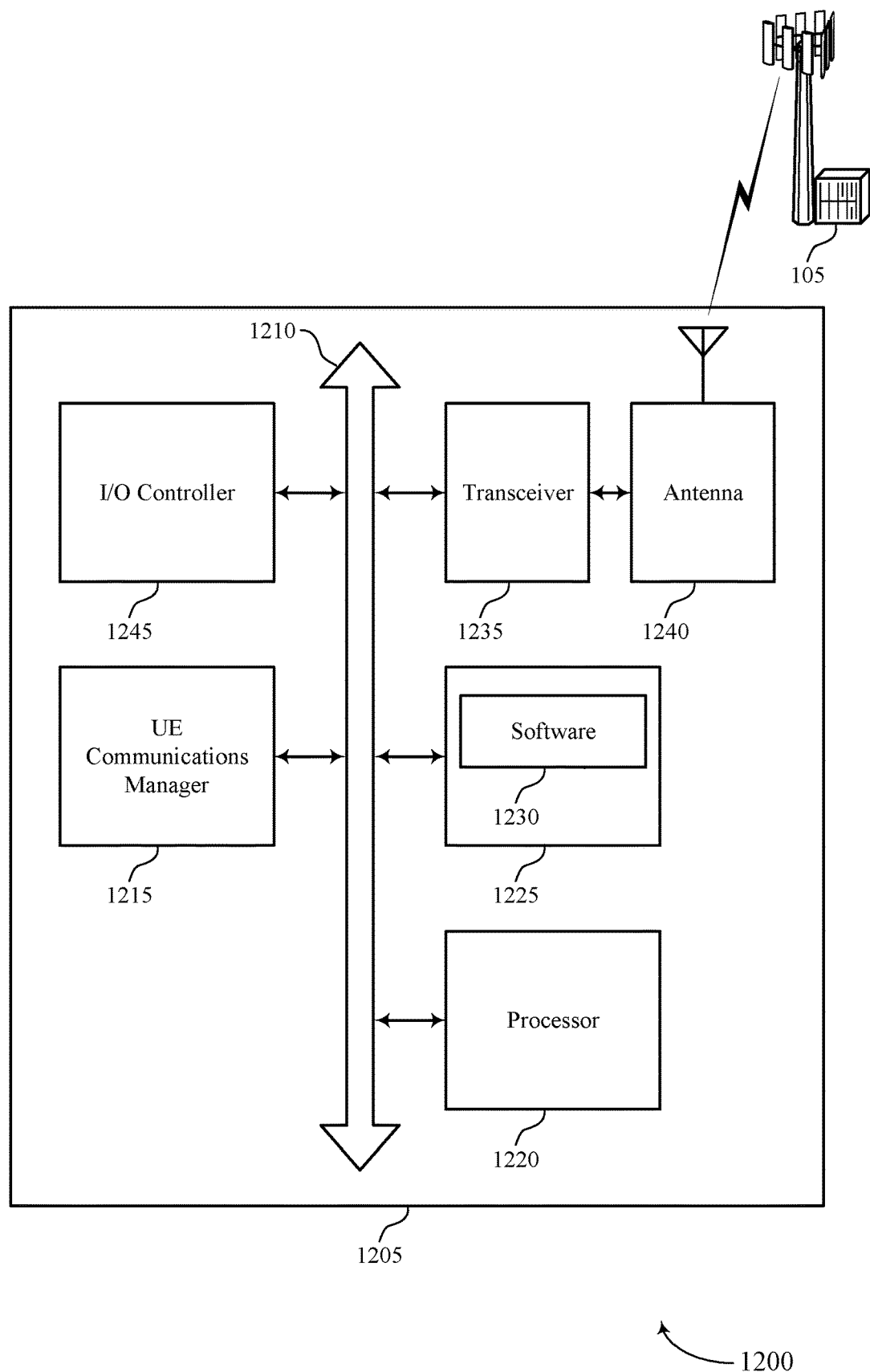
FIG. 12 illustrates a block diagram of a system including a user equipment (UE) in accordance with aspects of the present disclosure.

FIG. 12 shows a diagram of a system 1200 including a device 1205 in accordance with aspects of the present disclosure. Device 1205 may be an example of or include the components of wireless device 905, wireless device 1005, or a UE 115 as described above, e.g., with reference to FIGS. 9 and 10. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some examples, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting transmit diversity schemes for uplink sequence transmissions).

Memory 1225 may include random-access memory (RAM) and read-only memory (ROM). The memory 1225 may store computer-readable, computer-executable software 1230 including instructions that, when executed, cause the processor to perform various functions described herein. In some examples, the memory 1225 may contain, among other things, a basic input/output system (BIOS) which may control basic hardware or software operation such as the interaction with peripheral components or devices.

Software 1230 may include code to implement aspects of the present disclosure, including code to support transmit diversity schemes for uplink sequence transmissions. Software 1230 may be stored in a non-transitory computer-readable medium such as system memory or other memory. In some examples, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some examples, the wireless device may include a single antenna 1240. However, in some examples the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some examples, I/O controller 1245 may represent a physical connection or port to an external peripheral. In some aspects, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some examples, I/O controller 1245 may be implemented as part of a processor. In some examples, a user may interact with device 1205 via I/O controller 1245 or via hardware components controlled by I/O controller 1245.

Figure 13:
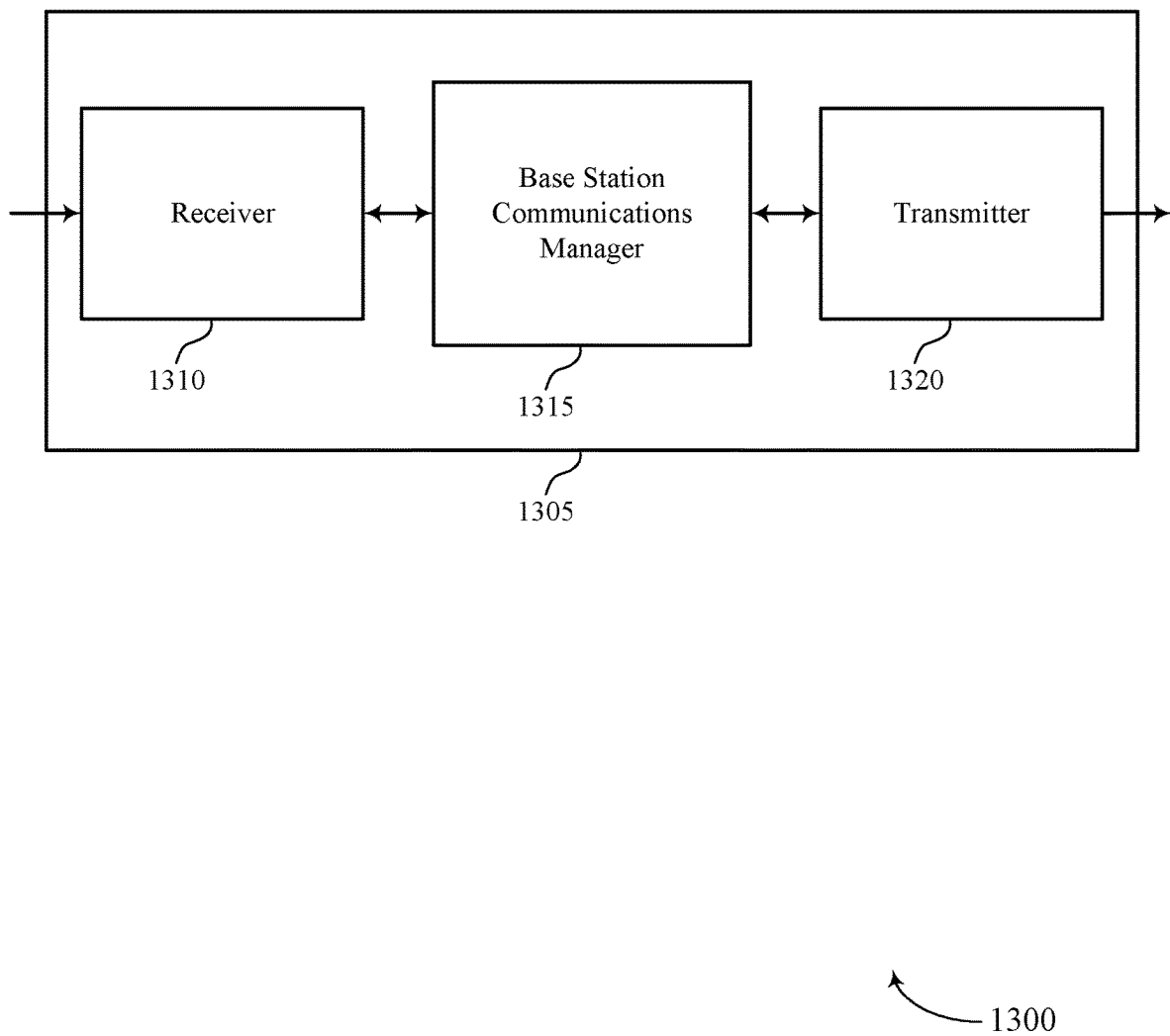
FIGS. 13 through 15 show block diagrams of a device in accordance with aspects of the present disclosure.

FIG. 13 shows a block diagram 1300 of a wireless device 1305 in accordance with aspects of the present disclosure. Wireless device 1305 may be an example of aspects of a base station 105 as described herein. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to transmit diversity schemes for uplink sequence transmissions, etc.). Information may be passed on to other components of the device. The receiver 1310 may be an example of aspects of the transceiver 1635 described with reference to FIG. 16. The receiver 1310 may utilize a single antenna or a set of antennas.

Base station communications manager 1315 may be an example of aspects of the base station communications manager 1615 described with reference to FIG. 16. Base station communications manager 1315 and/or at least some of its various sub-components may be implemented in hardware, software executed by a processor, firmware, or any combination thereof. If implemented in software executed by a processor, the functions of the base station communications manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1315 and/or at least some of its various sub-components may be physically located at various positions, including being distributed such that portions of functions are implemented at different physical locations by one or more physical devices. In some examples, base station communications manager 1315 and/or at least some of its various sub-components may be a separate and distinct component in accordance with various aspects of the present disclosure. In other examples, base station communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1315 may determine a transmit diversity scheme for receiving an uplink sequence from a UE 115, where the transmit diversity scheme is based on a number of symbol periods used by the UE 115 to transmit the uplink sequence, transmit an indication of the determined transmit diversity scheme for the UE 115 to transmit the uplink sequence using a set of transmit antennas, and receive the uplink sequence over the number of symbol periods, the uplink sequence being received in accordance with the determined transmit diversity scheme.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
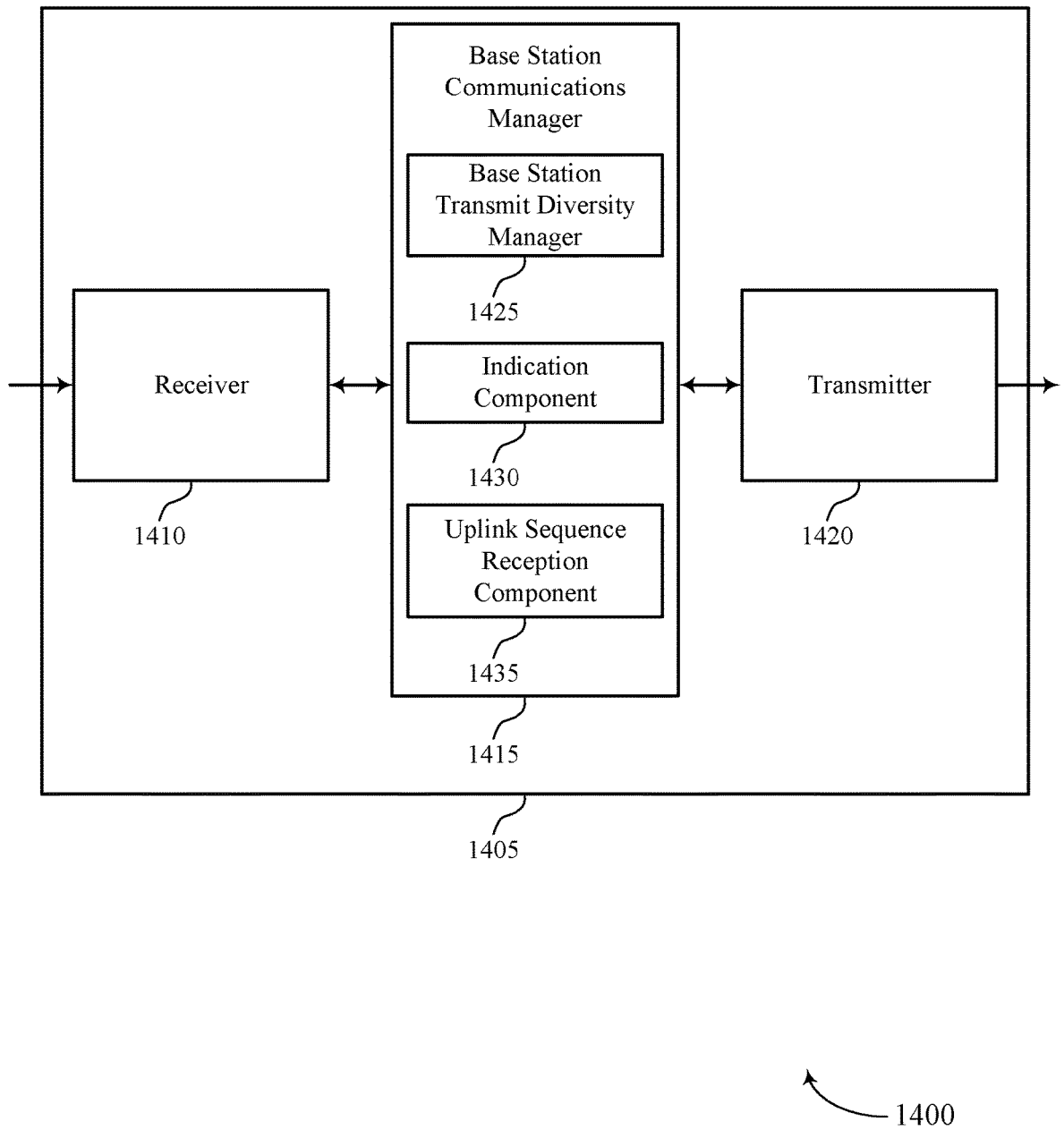

FIG. 14 shows a block diagram 1400 of a wireless device 1405 in accordance with aspects of the present disclosure. Wireless device 1405 may be an example of aspects of a wireless device 1305 or a base station 105 as described with reference to FIG. 13. Wireless device 1405 may include receiver 1410, base station communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to transmit diversity schemes for uplink sequence transmissions, etc.). Information may be passed on to other components of the device. The receiver 1410 may be an example of aspects of the transceiver 1635 described with reference to FIG. 16. The receiver 1410 may utilize a single antenna or a set of antennas.

Base station communications manager 1415 may be an example of aspects of the base station communications manager 1615 described with reference to FIG. 16. Base station communications manager 1415 may also include base station transmit diversity manager 1425, indication component 1430, and uplink sequence reception component 1435.

Base station transmit diversity manager 1425 may determine a transmit diversity scheme for receiving an uplink sequence from a UE 115, where the transmit diversity scheme is based on a number of symbol periods used by the UE 115 to transmit the uplink sequence. Indication component 1430 may transmit an indication of the determined transmit diversity scheme for the UE 115 to transmit the uplink sequence using a set of transmit antennas. Uplink sequence reception component 1435 may receive the uplink sequence over the number of symbol periods, the uplink sequence being received in accordance with the determined transmit diversity scheme.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
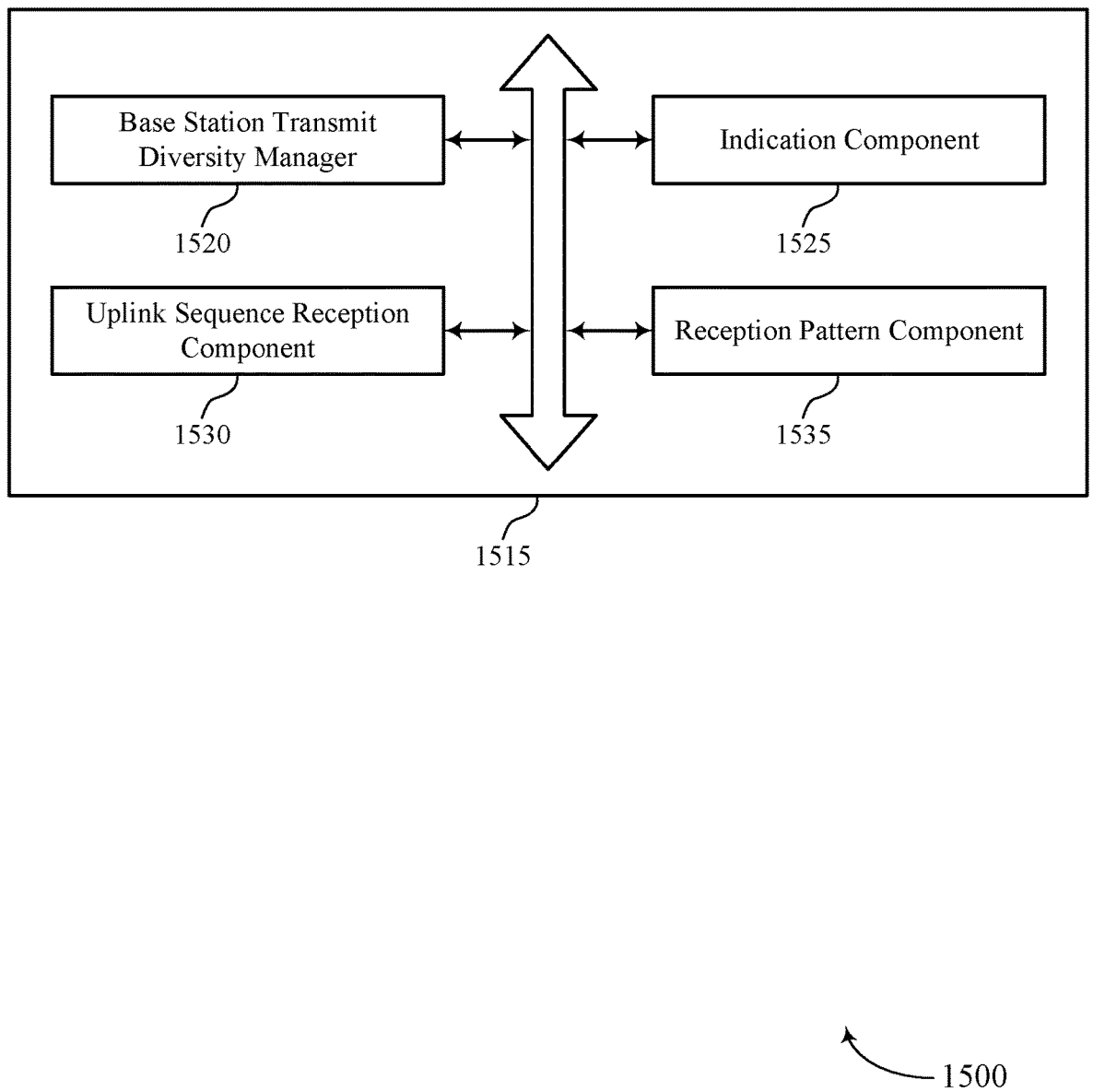

FIG. 15 shows a block diagram 1500 of a base station communications manager 1515 in accordance with aspects of the present disclosure. The base station communications manager 1515 may be an example of aspects of a base station communications manager 1615 described with reference to FIGS. 13, 14, and 16. The base station communications manager 1515 may include base station transmit diversity manager 1520, indication component 1525, uplink sequence reception component 1530, and reception pattern component 1535. Each of these modules may communicate, directly or indirectly, with one another (e.g., via one or more buses).

Base station transmit diversity manager 1520 may determine a transmit diversity scheme for receiving an uplink sequence from a UE 115, where the transmit diversity scheme is based on a number of symbol periods used by the UE 115 to transmit the uplink sequence. In some aspects, determining the transmit diversity scheme for the uplink sequence includes: selecting the transmit diversity scheme from a set of preconfigured transmit diversity schemes.

Indication component 1525 may transmit an indication of the determined transmit diversity scheme for the UE 115 to transmit the uplink sequence using a set of transmit antennas. Uplink sequence reception component 1530 may receive the uplink sequence over the number of symbol periods, the uplink sequence being received in accordance with the determined transmit diversity scheme. In some examples, uplink sequence reception component 1530 may receive the first uplink sequence on a first set of resources and receive the uplink sequence on a second set of resources, the uplink sequence transmitted using a second transmit antenna of the set of transmit antennas, where the uplink sequence is received over a single symbol period.

In some examples, uplink sequence reception component 1530 may receive the uplink sequence on a first set of resources and transmitted using a first transmit antenna of the set of transmit antennas and receive the uplink sequence on a second set of resources and transmitted using a second antenna of the set of transmit antennas. Alternatively, uplink sequence reception component 1530 may receive a first uplink sequence transmitted using a first transmit antenna of the set of transmit antennas and receive a second uplink sequence transmitted using a second transmit antenna of the set of transmit antennas, where the first uplink sequence and the second uplink sequence are received over a single symbol period.

In some aspects, uplink sequence reception component 1530 may receive the uplink sequence over a first symbol period and transmitted using a first transmit antenna of the set of transmit antennas, and receive the uplink sequence over a second symbol period and transmitted using a second transmit antenna of the set of transmit antennas. In some examples, uplink sequence reception component 1530 may receive a first portion of the uplink sequence over a first symbol period, the first portion of the uplink sequence transmitted using a first transmit antenna of the set of transmit antennas and receive a second portion of the uplink sequence over a second symbol period, the second portion of the uplink sequence transmitted using a second transmit antenna of the set of transmit antennas.

In some examples, uplink sequence reception component 1530 may receive a first uplink sequence on a first set of resources, the first uplink sequence transmitted using a first transmit antenna of the set of transmit antennas and receive a second uplink sequence on a second set of resources, the second uplink sequence transmitted using a second transmit antenna of the set of transmit antennas, where the first uplink sequence and the second uplink sequence are received over a two symbol periods.

In some examples, uplink sequence reception component 1530 may receive a first uplink sequence transmitted using a first transmit antenna of the set of transmit antennas and receive a second uplink sequence transmitted using a second transmit antenna of the set of transmit antennas, where the first uplink sequence and the second uplink sequence are received over a first symbol period. Additionally, uplink sequence reception component 1530 may receive a repetition of the first uplink sequence transmitted using the first transmit antenna of the set of transmit antennas and receive a repetition of the second uplink sequence transmitted using the second transmit antenna of the set of transmit antennas. The repetition of the first uplink sequence and the repetition of the second uplink sequence may be received over a second symbol period. In some examples, uplink sequence reception component 1530 may receive the first uplink sequence, or the second uplink sequence, or the repetition of the first uplink sequence, or the repetition of the second uplink sequence, or a combination thereof, in accordance with a frequency hopping pattern, or a sequence hopping pattern, or a combination thereof.

In some examples, the uplink sequence includes a sequence-based sPUCCH, and where the sequence-based sPUCCH also includes 1-bit uplink control information or 2-bit uplink control information. In some cases, the first uplink sequence and the second uplink sequence include a different base sequence. In some examples, the first uplink sequence includes a first base sequence, and the second uplink sequence includes a shift of the first base sequence, where the shift includes a time domain cyclic shift, or a frequency domain phase rotation, or a combination thereof. In some aspects, the first uplink sequence and the second uplink sequence include an Alamouti pair. Reception pattern component 1535 may receive the uplink sequence over the first symbol period and the second symbol period in accordance with a frequency hopping pattern, or a sequence hopping pattern, or a combination thereof.

Figure 16:
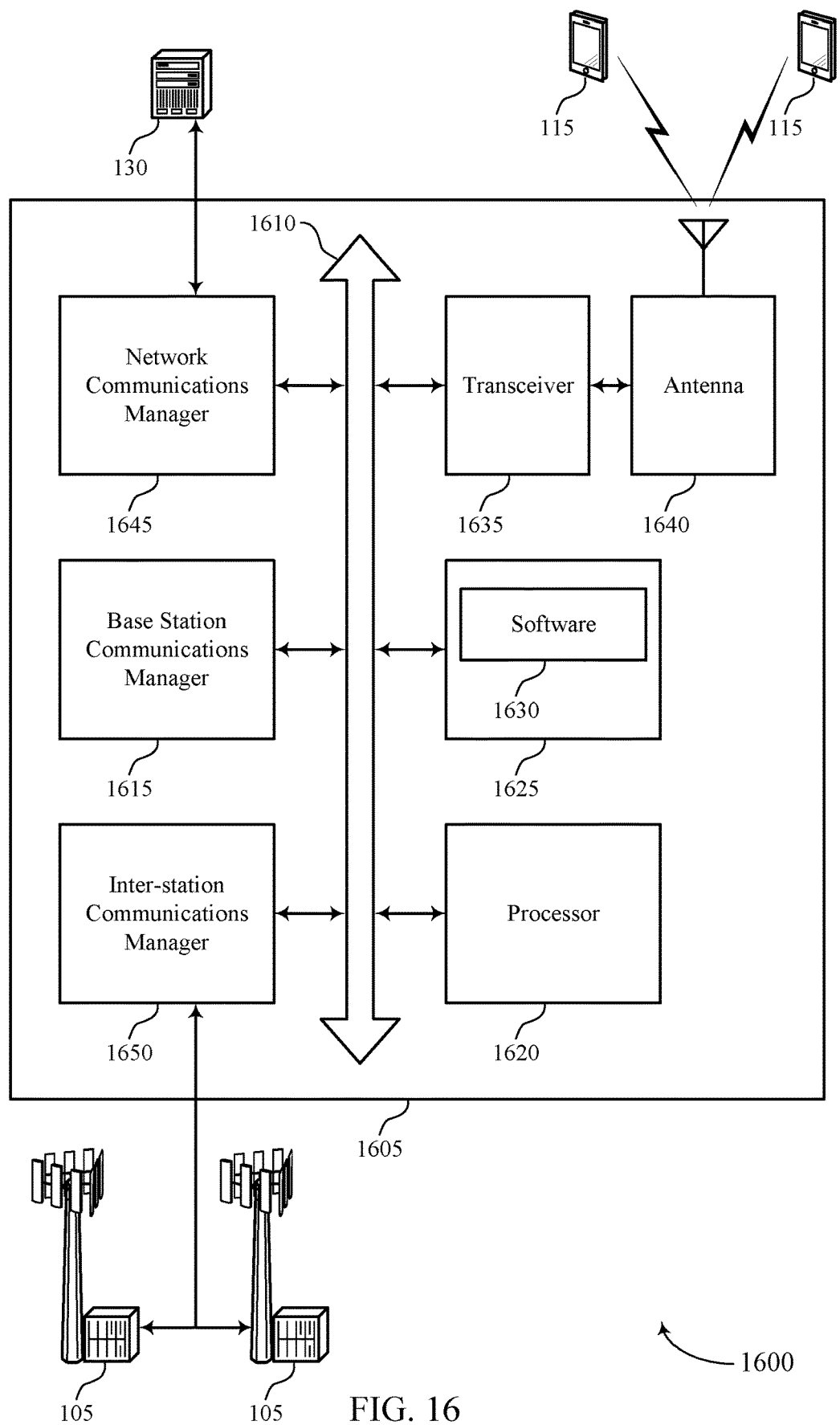
FIG. 16 illustrates a block diagram of a system including a base station in accordance with aspects of the present disclosure.

FIG. 16 shows a diagram of a system 1600 including a device 1605 in accordance with aspects of the present disclosure. Device 1605 may be an example of or include the components of base station 105 as described above, e.g., with reference to FIG. 1. Device 1605 may include components for bi-directional voice and data communications including components for transmitting and receiving communications, including base station communications manager 1615, processor 1620, memory 1625, software 1630, transceiver 1635, antenna 1640, network communications manager 1645, and inter-station communications manager 1650. These components may be in electronic communication via one or more buses (e.g., bus 1610). Device 1605 may communicate wirelessly with one or more UEs 115.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some aspects, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting transmit diversity schemes for uplink sequence transmissions).

Memory 1625 may include RAM and ROM. The memory 1625 may store computer-readable, computer-executable software 1630 including instructions that, when executed, cause the processor to perform various functions described herein. In some examples, the memory 1625 may contain, among other things, a BIOS that may control basic hardware or software operation such as the interaction with peripheral components or devices.

Software 1630 may include code to implement aspects of the present disclosure, including code to support transmit diversity schemes for uplink sequence transmissions. Software 1630 may be stored in a non-transitory computer-readable medium such as system memory or other memory. In some examples, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas. In some examples, the wireless device may include a single antenna 1640. However, in some examples the device may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Inter-station communications manager 1650 may manage communications with other base station 105, and may include a controller or scheduler for controlling communications with UEs 115 in cooperation with other base stations 105. For example, the inter-station communications manager 1650 may coordinate scheduling for transmissions to UEs 115 for various interference mitigation techniques such as beamforming or joint transmission. In some examples, inter-station communications manager 1650 may provide an X2 interface within an Long Term Evolution (LTE)/LTE-A wireless communication network technology to provide communication between base stations 105.

Figure 17:
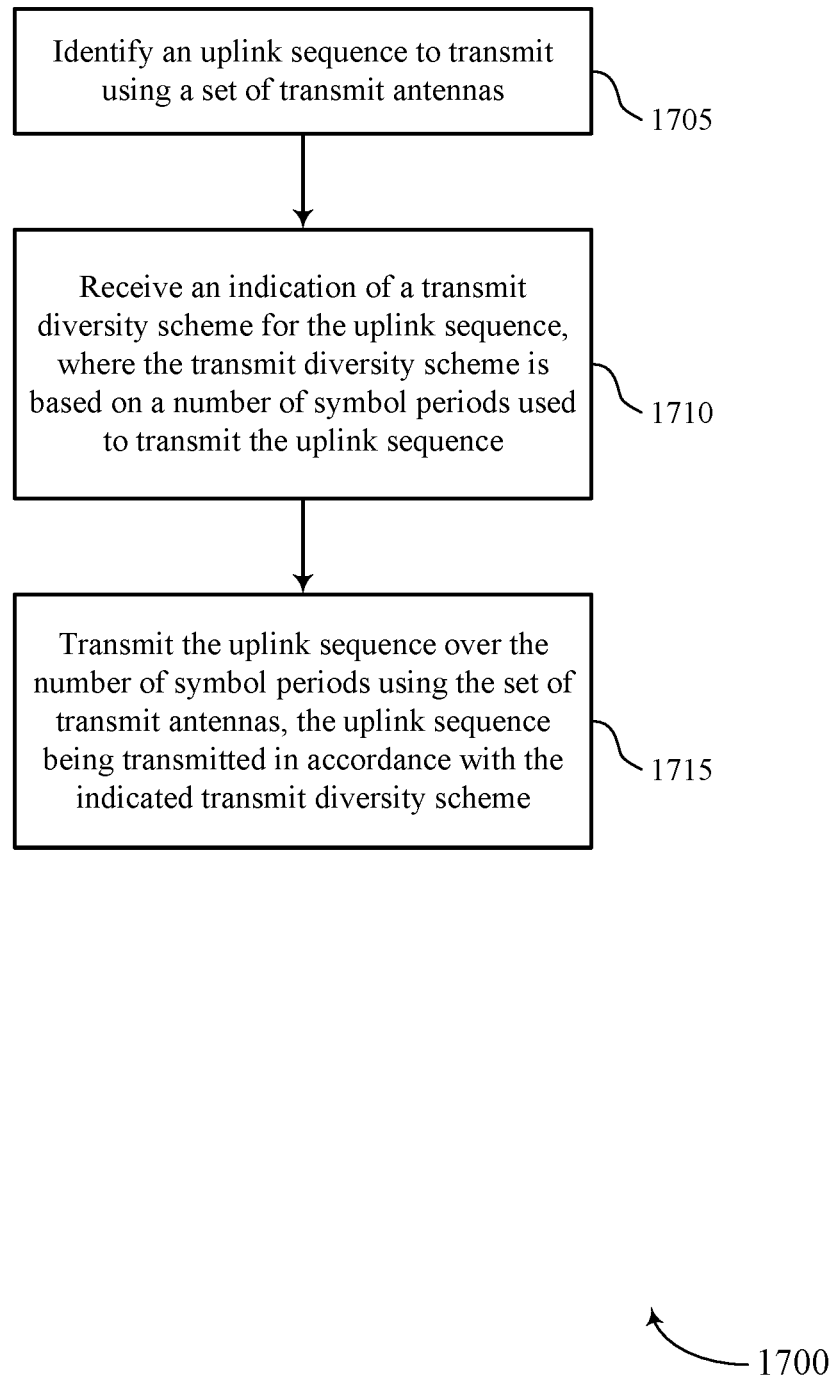
FIGS. 17 through 22 illustrate methods in accordance with aspects of the present disclosure.

FIG. 17 shows a flowchart illustrating a method 1700 in accordance with aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE 115 may execute a set of codes to control the functional elements of the device to perform the functions described below. Additionally, the UE 115 may perform aspects of the functions described below using special-purpose hardware.

At 1705 the UE 115 may identify an uplink sequence to transmit using a set of transmit antennas. The operations of 1705 may be performed according to the methods described herein. In certain examples, aspects of the operations of 1705 may be performed by an uplink sequence manager as described with reference to FIGS. 9 through 12.

At 1710 the UE 115 may receive an indication of a transmit diversity scheme for the uplink sequence, wherein the transmit diversity scheme is based at least in part on a number of symbol periods used to transmit the uplink sequence. The operations of 1710 may be performed according to the methods described herein. In certain examples, aspects of the operations of 1710 may be performed by a UE transmit diversity manager as described with reference to FIGS. 9 through 12.

At 1715 the UE 115 may transmit the uplink sequence over the number of symbol periods using the set of transmit antennas, the uplink sequence being transmitted in accordance with the indicated transmit diversity scheme. The operations of 1715 may be performed according to the methods described herein. In certain examples, aspects of the operations of 1715 may be performed by a sequence transmission component as described with reference to FIGS. 9 through 12.

Figure 18:
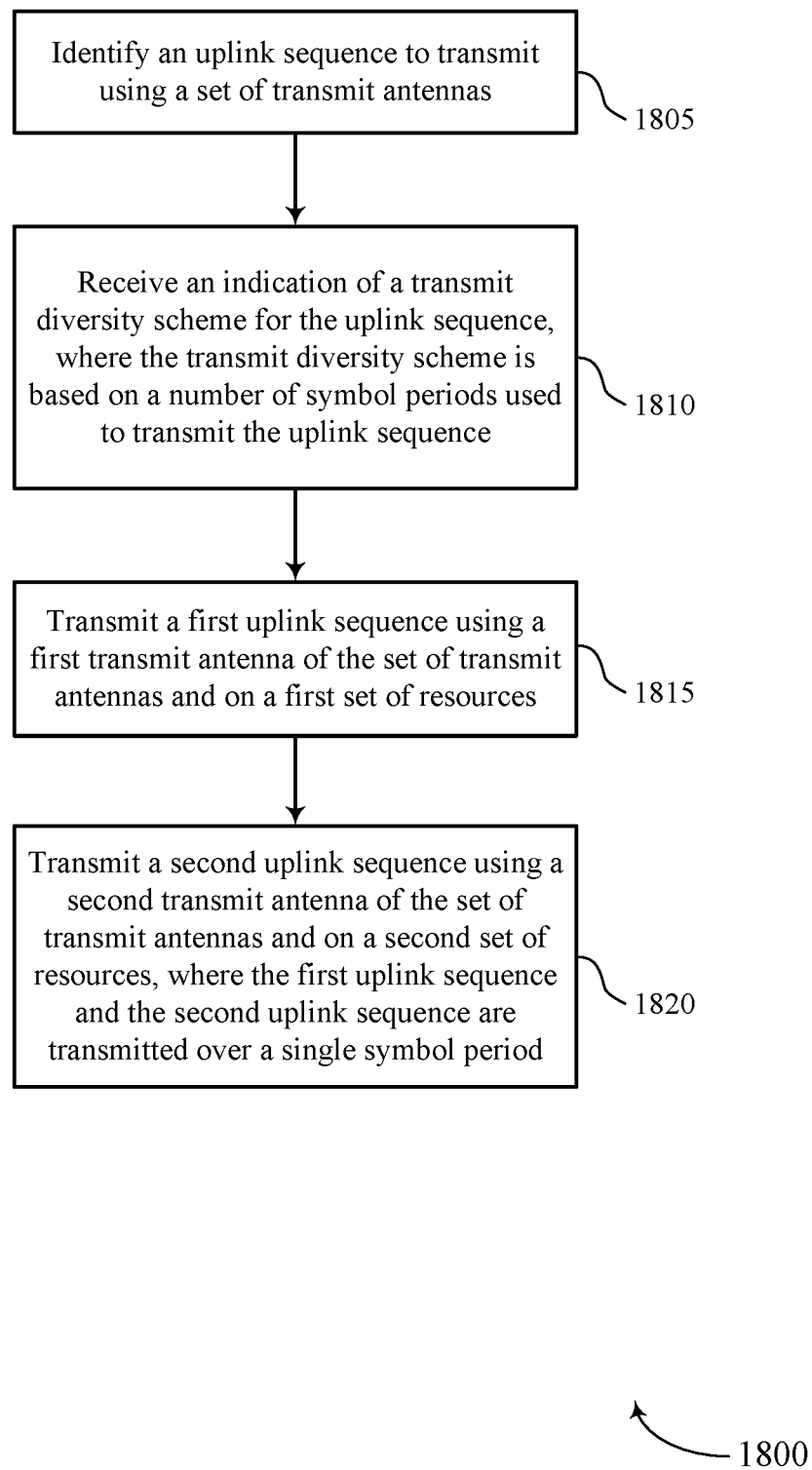

FIG. 18 shows a flowchart illustrating a method 1800 in accordance with aspects of the present disclosure. The operations of method 1800 may be implemented by a UE 115 or its components as described herein. For example, the operations of method 1800 may be performed by a UE communications manager as described with reference to FIGS. 9 through 12. In some examples, a UE 115 may execute a set of codes to control the functional elements of the device to perform the functions described below. Additionally, the UE 115 may perform aspects of the functions described below using special-purpose hardware.

At 1805 the UE 115 may identify an uplink sequence to transmit using a set of transmit antennas. The operations of 1805 may be performed according to the methods described herein. In certain examples, aspects of the operations of 1805 may be performed by an uplink sequence manager as described with reference to FIGS. 9 through 12.

At 1810 the UE 115 may receive an indication of a transmit diversity scheme for the uplink sequence, wherein the transmit diversity scheme is based at least in part on a number of symbol periods used to transmit the uplink sequence. The operations of 1810 may be performed according to the methods described herein. In certain examples, aspects of the operations of 1810 may be performed by a UE transmit diversity manager as described with reference to FIGS. 9 through 12.

At 1815 the UE 115 may transmit a first uplink sequence using a first transmit antenna of the set of transmit antennas and on a first set of resources. The operations of 1815 may be performed according to the methods described herein. In certain examples, aspects of the operations of 1815 may be performed by a sequence transmission component as described with reference to FIGS. 9 through 12.

At 1820 the UE 115 may transmit a second uplink sequence using a second transmit antenna of the set of transmit antennas and on a second set of resources, wherein the first uplink sequence and the second uplink sequence are transmitted over a single symbol period. The operations of 1820 may be performed according to the methods described herein. In certain examples, aspects of the operations of 1820 may be performed by a transmit antenna manager as described with reference to FIGS. 9 through 12.

Figure 19:
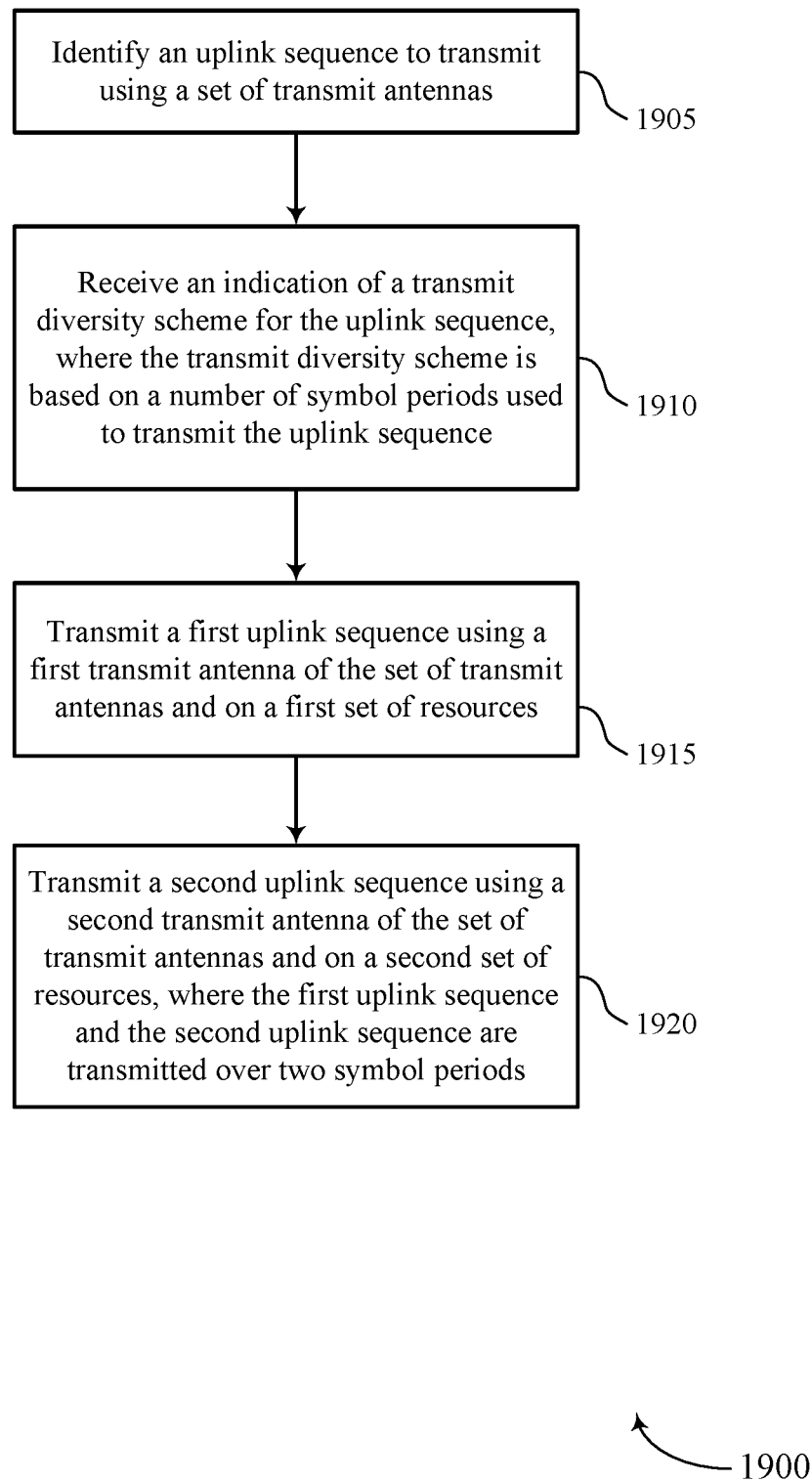

FIG. 19 shows a flowchart illustrating a method 1900 in accordance with aspects of the present disclosure. The operations of method 1900 may be implemented by a UE 115 or its components as described herein. For example, the operations of method 1900 may be performed by a UE communications manager as described with reference to FIGS. 9 through 12. In some examples, a UE 115 may execute a set of codes to control the functional elements of the device to perform the functions described below. Additionally, the UE 115 may perform aspects of the functions described below using special-purpose hardware.

At 1905 the UE 115 may identify an uplink sequence to transmit using a set of transmit antennas. The operations of 1905 may be performed according to the methods described herein. In certain examples, aspects of the operations of 1905 may be performed by an uplink sequence manager as described with reference to FIGS. 9 through 12.

At 1910 the UE 115 may receive an indication of a transmit diversity scheme for the uplink sequence, wherein the transmit diversity scheme is based at least in part on a number of symbol periods used to transmit the uplink sequence. The operations of 1910 may be performed according to the methods described herein. In certain examples, aspects of the operations of 1910 may be performed by a UE transmit diversity manager as described with reference to FIGS. 9 through 12.

At 1915 the UE 115 may transmit a first uplink sequence using a first transmit antenna of the set of transmit antennas and on a first set of resources. The operations of 1915 may be performed according to the methods described herein. In certain examples, aspects of the operations of 1915 may be performed by a sequence transmission component as described with reference to FIGS. 9 through 12.

At 1920 the UE 115 may transmit a second uplink sequence using a second transmit antenna of the set of transmit antennas and on a second set of resources, wherein the first uplink sequence and the second uplink sequence are transmitted over two symbol periods. The operations of 1920 may be performed according to the methods described herein. In certain examples, aspects of the operations of 1920 may be performed by a transmit antenna manager as described with reference to FIGS. 9 through 12.

Figure 20:
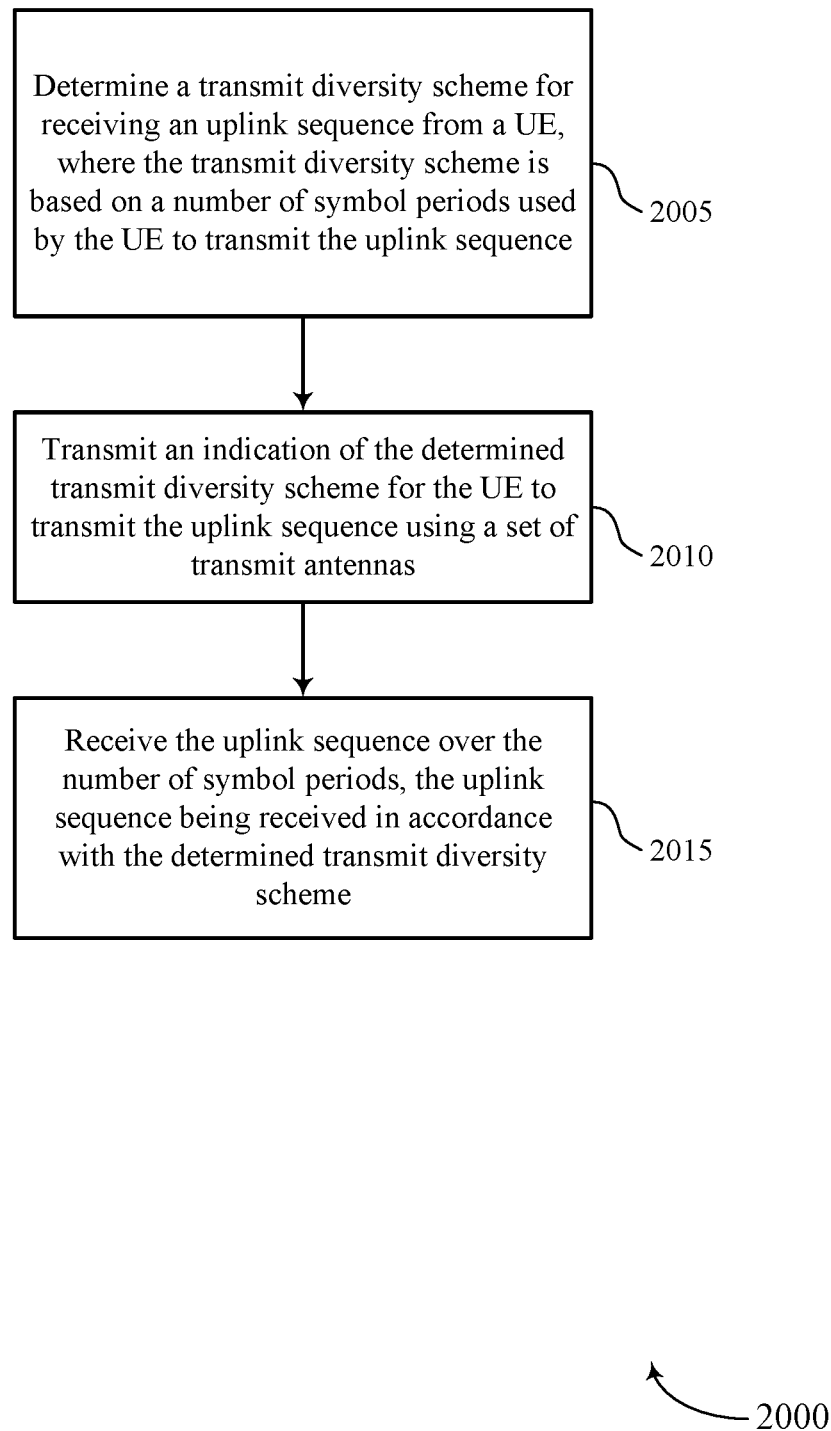

FIG. 20 shows a flowchart illustrating a method 2000 in accordance with aspects of the present disclosure. The operations of method 2000 may be implemented by a base station 105 or its components as described herein. For example, the operations of method 2000 may be performed by a base station communications manager as described with reference to FIGS. 13 through 16. In some examples, a base station 105 may execute a set of codes to control the functional elements of the device to perform the functions described below. Additionally, the base station 105 may perform aspects of the functions described below using special-purpose hardware.

At 2005 the base station 105 may determine a transmit diversity scheme for receiving an uplink sequence from a UE 115, wherein the transmit diversity scheme is based at least in part on a number of symbol periods used by the UE 115 to transmit the uplink sequence. The operations of 2005 may be performed according to the methods described herein. In certain examples, aspects of the operations of 2005 may be performed by a base station transmit diversity manager as described with reference to FIGS. 13 through 16.

At 2010 the base station 105 may transmit an indication of the determined transmit diversity scheme for the UE 115 to transmit the uplink sequence using a set of transmit antennas. The operations of 2010 may be performed according to the methods described herein. In certain examples, aspects of the operations of 2010 may be performed by an indication component as described with reference to FIGS. 13 through 16.

At 2015 the base station 105 may receive the uplink sequence over the number of symbol periods, the uplink sequence being received in accordance with the determined transmit diversity scheme. The operations of 2015 may be performed according to the methods described herein. In certain examples, aspects of the operations of 2015 may be performed by an uplink sequence reception component as described with reference to FIGS. 13 through 16.

Figure 21:
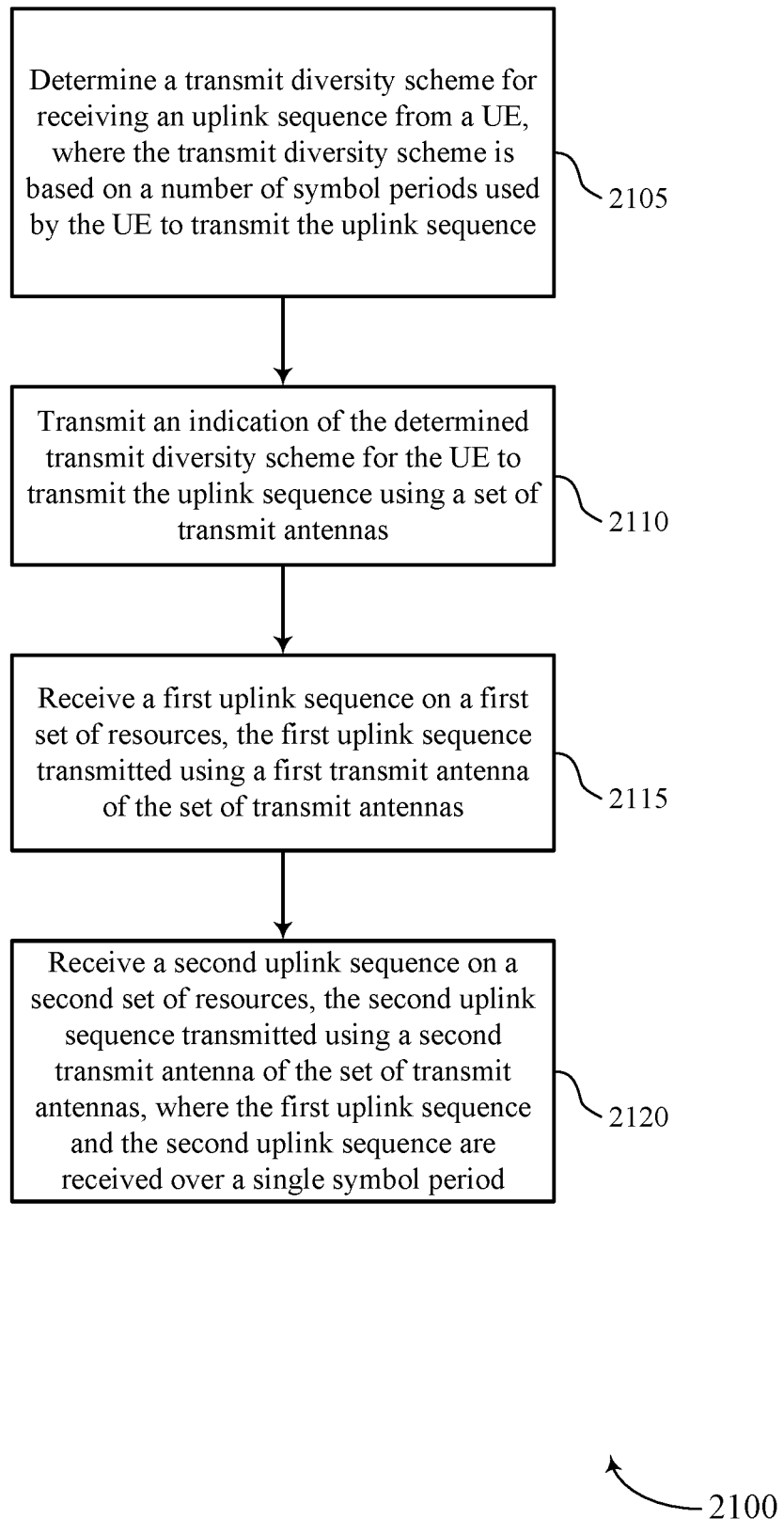

FIG. 21 shows a flowchart illustrating a method 2100 in accordance with aspects of the present disclosure. The operations of method 2100 may be implemented by a base station 105 or its components as described herein. For example, the operations of method 2100 may be performed by a base station communications manager as described with reference to FIGS. 13 through 16. In some examples, a base station 105 may execute a set of codes to control the functional elements of the device to perform the functions described below. Additionally, the base station 105 may perform aspects of the functions described below using special-purpose hardware.

At 2105 the base station 105 may determine a transmit diversity scheme for receiving an uplink sequence from a UE 115, wherein the transmit diversity scheme is based at least in part on a number of symbol periods used by the UE 115 to transmit the uplink sequence. The operations of 2105 may be performed according to the methods described herein. In certain examples, aspects of the operations of 2105 may be performed by a base station transmit diversity manager as described with reference to FIGS. 13 through 16.

At 2110 the base station 105 may transmit an indication of the determined transmit diversity scheme for the UE 115 to transmit the uplink sequence using a set of transmit antennas. The operations of 2110 may be performed according to the methods described herein. In certain examples, aspects of the operations of 2110 may be performed by an indication component as described with reference to FIGS. 13 through 16.

At 2115 the base station 105 may receive a first uplink sequence on a first set of resources, the first uplink sequence transmitted using a first transmit antenna of the set of transmit antennas. The operations of 2115 may be performed according to the methods described herein. In certain examples, aspects of the operations of 2115 may be performed by an uplink sequence reception component as described with reference to FIGS. 13 through 16.

At 2120 the base station 105 may receive a second uplink sequence on a second set of resources, the second uplink sequence transmitted using a second transmit antenna of the set of transmit antennas, wherein the first uplink sequence and the second uplink sequence are received over a single symbol period. The operations of 2120 may be performed according to the methods described herein. In certain examples, aspects of the operations of 2120 may be performed by an uplink sequence reception component as described with reference to FIGS. 13 through 16.

Figure 22:
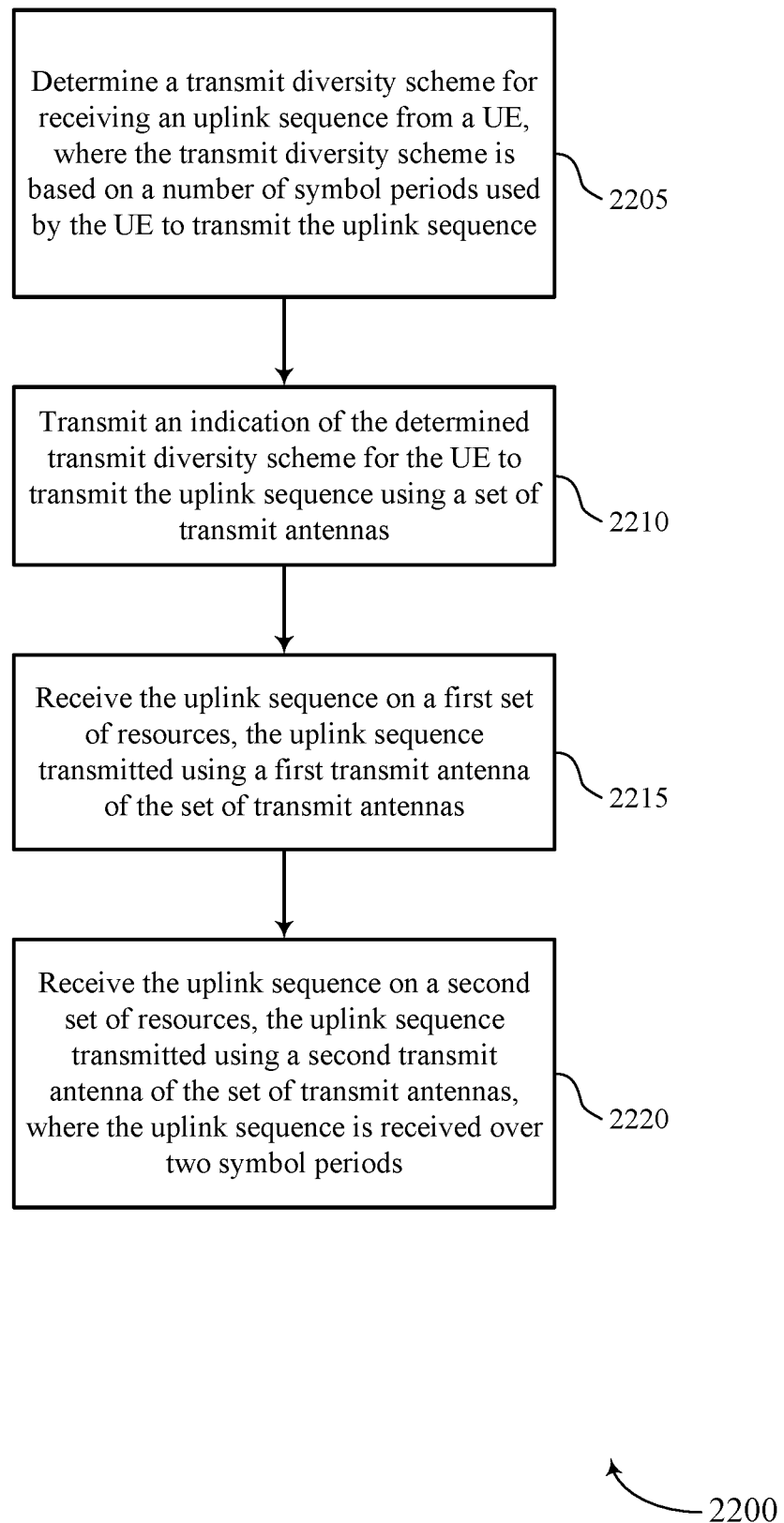

FIG. 22 shows a flowchart illustrating a method 2200 in accordance with aspects of the present disclosure. The operations of method 2200 may be implemented by a base station 105 or its components as described herein. For example, the operations of method 2200 may be performed by a base station communications manager as described with reference to FIGS. 13 through 16. In some examples, a base station 105 may execute a set of codes to control the functional elements of the device to perform the functions described below. Additionally, the base station 105 may perform aspects of the functions described below using special-purpose hardware.

At 2205 the base station 105 may determine a transmit diversity scheme for receiving an uplink sequence from a UE 115, wherein the transmit diversity scheme is based at least in part on a number of symbol periods used by the UE 115 to transmit the uplink sequence. The operations of 2205 may be performed according to the methods described herein. In certain examples, aspects of the operations of 2205 may be performed by a base station transmit diversity manager as described with reference to FIGS. 13 through 16.

At 2210 the base station 105 may transmit an indication of the determined transmit diversity scheme for the UE 115 to transmit the uplink sequence using a set of transmit antennas. The operations of 2210 may be performed according to the methods described herein. In certain examples, aspects of the operations of 2210 may be performed by an indication component as described with reference to FIGS. 13 through 16.

At 2215 the base station 105 may receive the uplink sequence on a first set of resources, the uplink sequence transmitted using a first transmit antenna of the set of transmit antennas. The operations of 2215 may be performed according to the methods described herein. In certain examples, aspects of the operations of 2215 may be performed by an uplink sequence reception component as described with reference to FIGS. 13 through 16.

At 2220 the base station 105 may receive the uplink sequence on a second set of resources, the uplink sequence transmitted using a second transmit antenna of the set of transmit antennas, wherein the uplink sequence is received over two symbol periods. The operations of 2220 may be performed according to the methods described herein. In certain examples, aspects of the operations of 2220 may be performed by an uplink sequence reception component as described with reference to FIGS. 13 through 16.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying an uplink sequence for the UE to transmit using a set of transmit antennas, the uplink sequence comprising a first uplink sequence and a second uplink sequence, wherein the first uplink sequence and the second uplink sequence comprise a different base sequence;
   receiving an indication of a transmit diversity scheme for the uplink sequence, wherein the transmit diversity scheme is based at least in part on a number of symbol periods of a plurality of symbol periods, wherein a single symbol period of the plurality of symbol periods is used to transmit the uplink sequence;
   transmitting the first uplink sequence over the single symbol period of the plurality of symbol periods using a first transmit antenna of the set of transmit antennas; and
   transmitting the second uplink sequence over the single symbol period of the plurality of symbol periods using a second transmit antenna of the set of transmit antennas, the first and second uplink sequence being transmitted in accordance with the indicated transmit diversity scheme.

2. The method of claim 1, wherein transmitting the first and second uplink sequence comprises:
   transmitting the first uplink sequence on a first set of resources; and
   transmitting the second uplink sequence on a second set of resources.

3. The method of claim 1, wherein transmitting the first and second uplink sequence comprises:
   transmitting the first uplink sequence on a first set of resources using the first transmit antenna of the set of transmit antennas; and
   transmitting the second uplink sequence on a second set of resources using the second transmit antenna of the set of transmit antennas.

4. The method of claim 1, wherein transmitting the first and second uplink sequence comprises:
   transmitting the first uplink sequence over a first symbol period of the plurality of symbol periods using a first transmit antenna of the set of transmit antennas; and
   transmitting the second uplink sequence over a second symbol period of the plurality of symbol periods using a second transmit antenna of the set of transmit antennas.

5. The method of claim 4, wherein transmitting the first and second uplink sequence further comprises:
   transmitting the first and second uplink sequence over the first symbol period of the plurality of symbol periods and the second symbol period of the plurality of symbol periods using a frequency hopping pattern, or a sequence hopping pattern, or a combination thereof.

6. The method of claim 1, wherein transmitting the first and second uplink sequence comprises:
   transmitting the first uplink sequence using the first transmit antenna of the set of transmit antennas;
   transmitting the second uplink sequence using the second transmit antenna of the set of transmit antennas, wherein the first uplink sequence and the second uplink sequence are transmitted over a first symbol period of the plurality of symbol periods;
   transmitting a repetition of the first uplink sequence using the first transmit antenna of the set of transmit antennas; and
   transmitting a repetition of the second uplink sequence using the second transmit antenna of the set of transmit antennas, wherein the repetition of the first uplink sequence and the repetition of the second uplink sequence are transmitted over a second symbol period of the plurality of symbol periods.

7. The method of claim 6, wherein transmitting the first and second uplink sequence further comprises:
   transmitting the first uplink sequence, or the second uplink sequence, or the repetition of the first uplink sequence, or the repetition of the second uplink sequence, or a combination thereof, using a frequency hopping pattern, or a sequence hopping pattern, or a combination thereof.

8. The method of claim 1, further comprising:
transmitting a first portion of the uplink sequence over a first symbol period of the plurality of symbol periods using the first transmit antenna of the set of transmit antennas; and
transmitting a second portion of the uplink sequence over a second symbol period of the plurality of symbol periods using the second transmit antenna of the set of transmit antennas.

9. The method of claim 8, wherein transmitting the uplink sequence further comprises:
transmitting the uplink sequence over the first symbol period of the plurality of symbol periods and the second symbol period of the plurality of symbol periods using a frequency hopping pattern, or a sequence hopping pattern, or a combination thereof.

10. The method of claim 1, wherein transmitting the first and second uplink sequence comprises:
transmitting the first uplink sequence on a first set of resources using the first transmit antenna of the set of transmit antennas; and
transmitting the second uplink sequence on a second set of resources using the second transmit antenna of the set of transmit antennas, wherein the first uplink sequence and the second uplink sequence are transmitted over a two symbol periods of the plurality of symbol periods.

11. The method of claim 10, wherein the first uplink sequence and the second uplink sequence comprise an Alamouti pair.

12. The method of claim 1, further comprising:
selecting the transmit diversity scheme from a set of preconfigured transmit diversity schemes based at least in part on the indicated transmit diversity scheme.

13. The method of claim 1, wherein the uplink sequence comprises a sequence-based short physical uplink control channel (sPUCCH), and wherein the sequence-based sPUCCH comprises 1 bit uplink control information or 2 bit uplink control information.

14. A method for wireless communication at a base station, comprising:
determining a transmit diversity scheme for receiving an uplink sequence from a user equipment (UE), wherein the transmit diversity scheme is based at least in part on a number of symbol periods of a plurality of symbol periods, wherein a single symbol period of the plurality of symbol periods is used by the UE to transmit the uplink sequence, the uplink sequence comprising a first uplink sequence and a second uplink sequence, wherein the first uplink sequence and the second uplink sequence comprise a different base sequence;
transmitting an indication of the determined transmit diversity scheme for the UE to transmit the uplink sequence using a set of transmit antennas;
receiving a first uplink sequence transmitted over the single symbol period of the plurality of symbol periods using a first transmit antenna of the set of transmit antennas; and
receiving the second uplink sequence over the single symbol period of the plurality of symbol periods transmitted using a second transmit antenna of the set of transmit antennas, the uplink sequence being received in accordance with the determined transmit diversity scheme.

15. The method of claim 14, wherein receiving the first and second uplink sequence comprises:
receiving the first uplink sequence on a first set of resources; and
receiving the second uplink sequence on a second set of resources.

16. The method of claim 14, wherein receiving the first and second uplink sequence comprises:
receiving the first uplink sequence, transmitted using the first transmit antenna of the set of transmit antennas, on a first set of resources; and
receiving the second uplink sequence, transmitted using the second transmit antenna of the set of transmit antennas, on a second set of resources.

17. The method of claim 14, wherein receiving the first and second uplink sequence comprises:
receiving the first uplink sequence, transmitted using the first transmit antenna of the set of transmit antennas, over a first symbol period; and
receiving the second uplink sequence, transmitted using the second transmit antenna of the set of transmit antennas, over a second symbol period.

18. The method of claim 14, wherein receiving the first and second uplink sequence comprises:
receiving the first uplink sequence transmitted using the first transmit antenna of the set of transmit antennas;
receiving the second uplink sequence transmitted using the second transmit antenna of the set of transmit antennas, wherein the first uplink sequence and the second uplink sequence are received over a first symbol period;
receiving a repetition of the first uplink sequence transmitted using the first transmit antenna of the set of transmit antennas; and
receiving a repetition of the second uplink sequence transmitted using the second transmit antenna of the set of transmit antennas, wherein the repetition of the first uplink sequence and the repetition of the second uplink sequence are received over a second symbol period.

19. The method of claim 14, further comprising:
receiving a first portion of the uplink sequence over a first symbol period, the first portion of the uplink sequence transmitted using the first transmit antenna of the set of transmit antennas; and
receiving a second portion of the uplink sequence over a second symbol period, the second portion of the uplink sequence transmitted using the second transmit antenna of the set of transmit antennas.

20. The method of claim 14, wherein receiving the first and second uplink sequence comprises:
receiving the first uplink sequence on a first set of resources, the first uplink sequence transmitted using the first transmit antenna of the set of transmit antennas; and
receiving the second uplink sequence on a second set of resources, the second uplink sequence transmitted using the second transmit antenna of the set of transmit antennas, wherein the first uplink sequence and the second uplink sequence are received over a two symbol periods.

21. The method of claim 14, wherein determining the transmit diversity scheme for the uplink sequence comprises:
selecting the transmit diversity scheme from a set of preconfigured transmit diversity schemes.

22. The method of claim 14, wherein the uplink sequence comprises a sequence-based short physical uplink control channel (sPUCCH), and wherein the sequence-based sPUCCH comprises 1 bit uplink control information or 2 bit uplink control information.

23. An apparatus for wireless communication, comprising:
- a processor;
- memory in electronic communication with the processor; and
- instructions stored in the memory and operable, when executed by the processor, to cause the apparatus to:
  - identify an uplink sequence to transmit using a set of transmit antennas, the uplink sequence comprising a first uplink sequence and a second uplink sequence, wherein the first uplink sequence and the second uplink sequence comprise a different base sequence;
  - receive an indication of a transmit diversity scheme for the uplink sequence, wherein the transmit diversity scheme is based at least in part on a number of symbol periods of a plurality of symbol periods, wherein a single symbol period of the plurality of symbol periods is used to transmit the uplink sequence;
  - transmit the first uplink sequence over the single symbol period of the plurality of symbol periods using a first transmit antenna of the set of transmit antennas; and
  - transmit the second uplink sequence over the single symbol period of the plurality of symbol periods using a second transmit antenna of the set of transmit antennas, the first and second uplink sequence being transmitted in accordance with the indicated transmit diversity scheme.

24. An apparatus for wireless communication, comprising:
- a processor;
- memory in electronic communication with the processor; and
- instructions stored in the memory and operable, when executed by the processor, to cause the apparatus to:
  - determine a transmit diversity scheme for receiving an uplink sequence from a user equipment (UE), wherein the transmit diversity scheme is based at least in part on a number of symbol periods of a plurality of symbol periods, wherein a single symbol period of the plurality of symbol periods is used by the UE to transmit the uplink sequence, the uplink sequence comprising a first uplink sequence and a second uplink sequence, wherein the first uplink sequence and the second uplink sequence comprise a different base sequence;
  - transmit an indication of the determined transmit diversity scheme for the UE to transmit the uplink sequence using a set of transmit antennas;
  - receive a first uplink sequence transmitted over the single symbol period of the plurality of symbol periods using a first transmit antenna of the set of transmit antennas; and
  - receive the second uplink sequence over the single symbol period of the plurality of symbol periods transmitted using a second transmit antenna of the set of transmit antennas, the uplink sequence being received in accordance with the determined transmit diversity scheme.

* * * * *